June 13, 1933.                E. STAEGEMANN                1,914,333
                           WATER TREATING APPARATUS
                           Filed April 25, 1931        15 Sheets-Sheet 2

INVENTOR.
Eugene Staegemann
BY
Edwin A. Packard
HIS ATTORNEY.

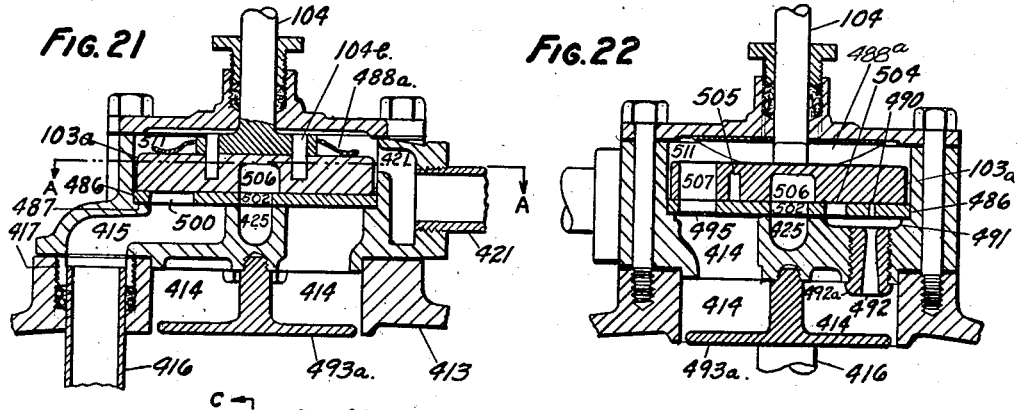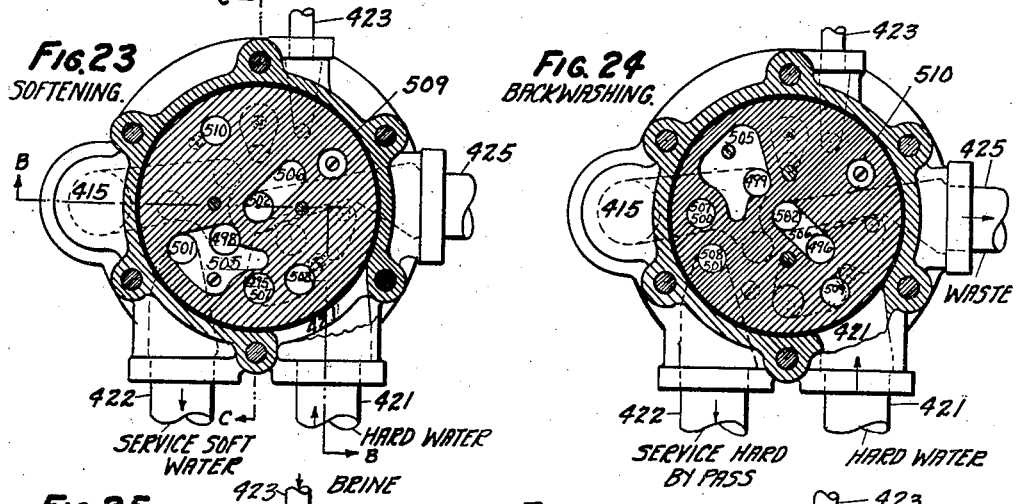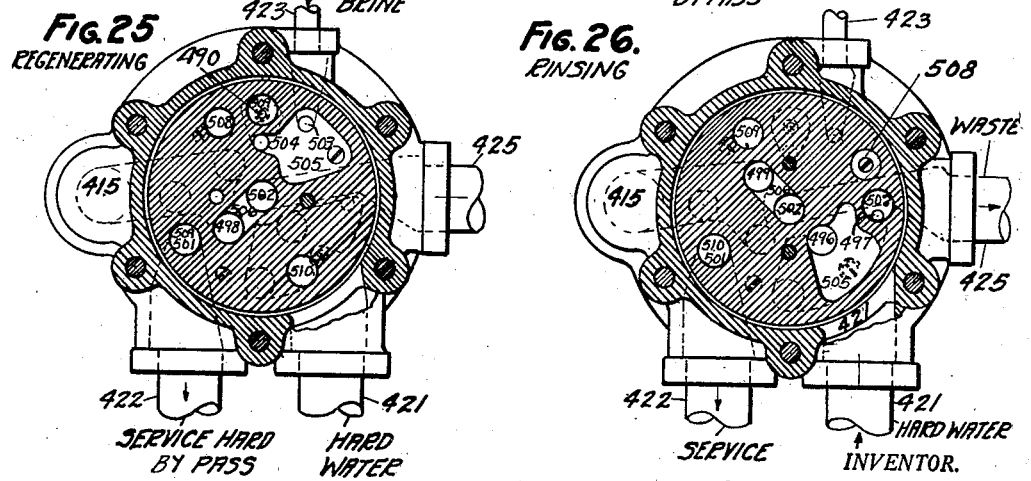

June 13, 1933.  E. STAEGEMANN  1,914,333
WATER TREATING APPARATUS
Filed April 25, 1931   15 Sheets-Sheet 15

INVENTOR.
Eugene Staegemann
BY
Edwin A. ......
HIS ATTORNEY.

Patented June 13, 1933

1,914,333

UNITED STATES PATENT OFFICE

EUGENE STAEGEMANN, OF ALLENDALE, NEW JERSEY, ASSIGNOR TO THE PERMUTIT COMPANY, OF NEW YORK, N. Y., A CORPORATION OF DELAWARE

WATER TREATING APPARATUS

Application filed April 25, 1931. Serial No. 532,929.

The invention according to its broader aspects relates and applies to water treating apparatus generally; that is, to water treating apparatus of various types or having different functional characteristics.

According to a certain aspect of the invention it relates and applies particularly to water softening apparatus employing zeolite or a base exchange material as a medium for converting hard water into soft water as the water is passed through a bed of such base exchange material.

In each of the several types of water treating apparatus there is employed some member or arrangement of parts that regulates or controls the functional characteristics of the apparatus; for example, in one type of apparatus there is an intermittently actuated driven member which is in the form of a spiral pump, or Archimedean screw pump, for feeding a certain or regulated quantity of chemical, as a strong acid, to water to be treated and in accordance with the quantity of water treated dependent upon the characteristics of the water. In another type there is an intermittently driven or positioned member in the form of a swinging pipe for supplying a certain or regulated quantity of chemical, such as lime soda solutions, to water to be treated dependent upon the characteristics of the water. In still another type of water treating apparatus, to wit, in a base exchange softener, it is advantageous to regulate or control functional features of the apparatus through the medium of a suitable rotatable cock or suitable valve mechanism that controls the functional characteristics of the apparatus and which valve mechanism is actuated or driven from an intermittently operated motor specifically referred to herein as a main electric motor.

According to the invention, in each form of the apparatus there is employed as an essential feature thereof the intermittently operated main electric motor. This motor is included in an electric system that provides different sets of electrical circuits or arrangements whereby one set is electrically completed or caused to be completed by a secondary switching mechanism, and another set is completed or caused to be completed at another time by a succeeding secondary switching mechanism to effect successive operation or functioning of the main electric motor. The arrangement of the electric system, however, is that at the proper period after completion each set (circuit or arrangement) is automatically disrupted by a circuit disrupting member, or circuit disrupting contactor as it may be called, before the succeeding set is completed by the succeeding secondary switching mechanism. The circuit disrupting member or "contactor" is part of what may be referred to as a main switch mechanism; the secondary switching mechanism previously referred to is properly termed and sometimes herein called "circuit completing switch" and sometimes "circuit initiating switch". The construction is such that the circuit disrupting member or contactor does not merely disrupt a circuit or arrangement which is then completed but also causes certain members or parts of the main switch to assume a closing position for the succeeding set (circuit or arrangement) that is to be subsequently completed by a secondary switching mechanism and which secondary switching mechanism may or may not be the same secondary switching mechanism as that which previously functioned to close the set. Whether or not the mentioned secondary switching mechanisms are the same is dependent largely upon the particular type of water treating apparatus with which the electric system is employed and of which the electrical system constitutes a part. Other characterizing features of the invention will be apparent from that which follows in the specification including the claims thereof.

As illustrative of certain specific manners in which the invention may be realized reference is made to the accompanying drawings forming a part of this specification and in which drawings, Figure 1 is a diagrammatic view of a water treating apparatus employing an automatic operating system for delivering a regulated or controlled quantity of strong acid in proportion to the quantity of water being treated. The arrangement of Figure 1 employs a spiral pump or Archimedean screw pump as a means for delivering acid to the water.

Figure 5:
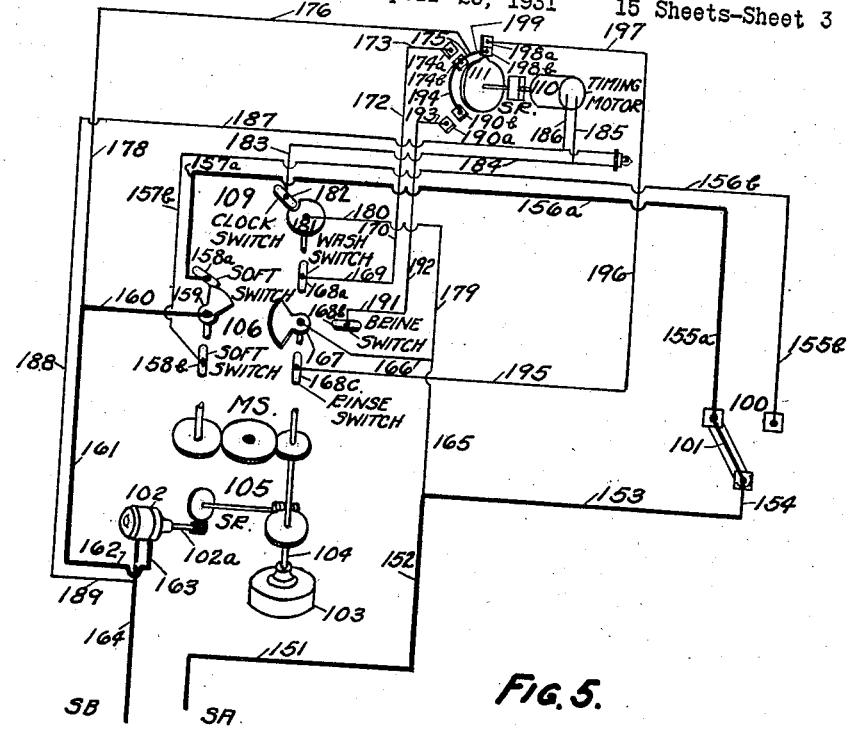

Figure 5 shows a wiring diagram of what is termed an electric semi-automatic water softener. Therein there is diagrammatically illustrated a main electric motor serving as means, through a speed reducing gearing, to position a rotatable multi-position, to wit, four position, cock or valve mechanism that controls the functioning of a softener, a secondary motor which is in fact an electric timing motor, and secondary switching mechanism controlled by the secondary motor; also certain mechanical arrangements collectively constituting a circuit disrupting member or contactor which is driven from and actuated by the electric motor through the medium of the reducing gearing. The circuit disrupting member is a part of that construction herein referred to as the main switching mechanism in which the circuit disrupting member or contactor does more than merely disrupt successive circuits; it causes certain contacts to be moved to switch closing position for a circuit succeeding the circuit previously disrupted. The parts shown in Figure 5 are in the position which they occupy when the water softener is in normal water softening position arrangement. The electric system in this figure includes a secondary switching mechanism in the form of an outside or hand-operated switch which upon being closed initiates the reconditioning cycle and which cycle when once initiated is automatically carried on thereafter under the control of the electric system until the water softening apparatus is restored to normal arrangement.

Figure 6:
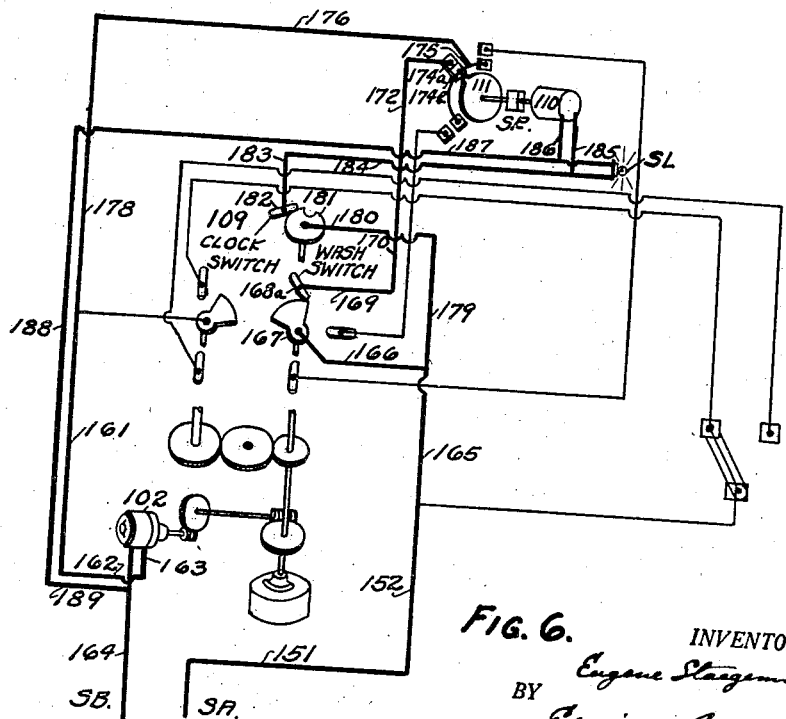

Figure 6 is an arrangement of the same parts shown in Figure 5 when in the position which they occupy when the softener is in what is known as backwashing position; that is, when the four position cock or valve mechanism is in position to cause a flow through the zeolite or base exchange material for the purpose of backwashing the same.

Figure 7:
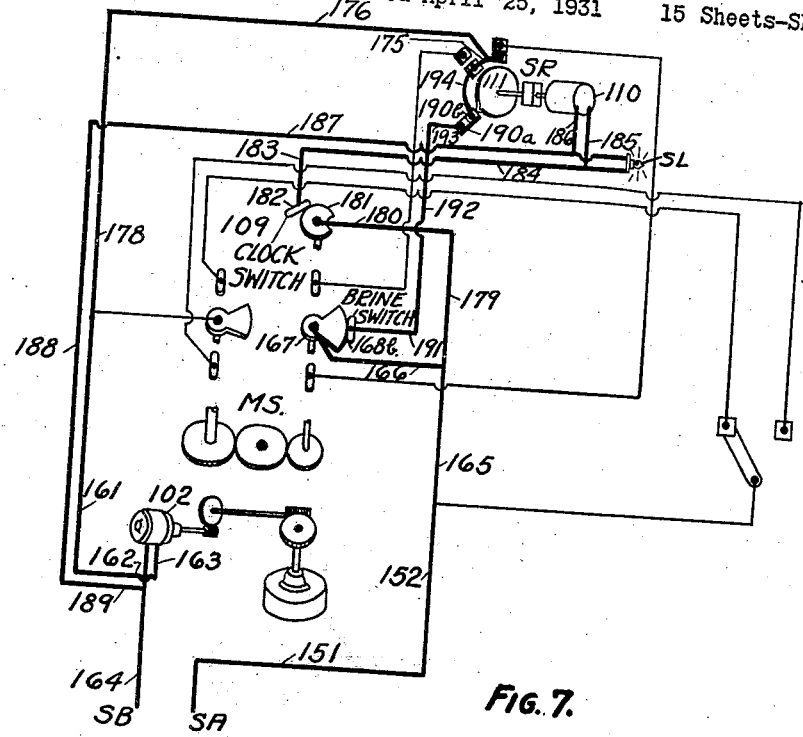

Figure 7 is a view showing the arrangement of parts of Figure 5 but in the position which they occupy when the four position cock or valve mechanism is in a position whereby brine is being supplied to the zeolite or base exchange material for the purpose of regenerating the same.

Figure 8:
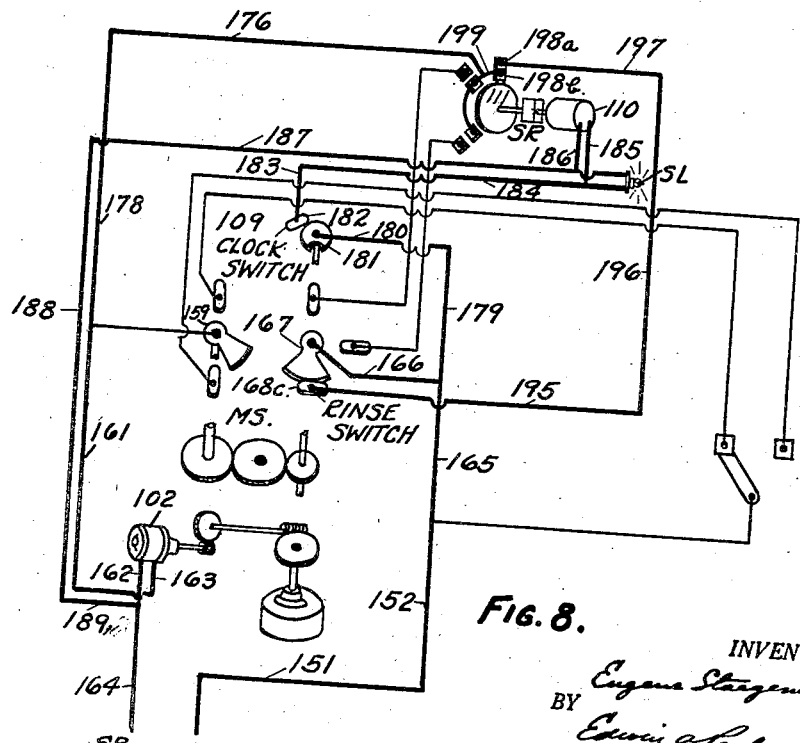

Figure 8 is a view of the parts shown in Figure 5 but in the arrangement which they occupy after the brining operation, to wit, at a period when rinse water is flowing through the bed of zeolite or base exchange material and thence to waste in order to eliminate any excess brine remaining in the bed after the regeneration operation.

Figure 9:
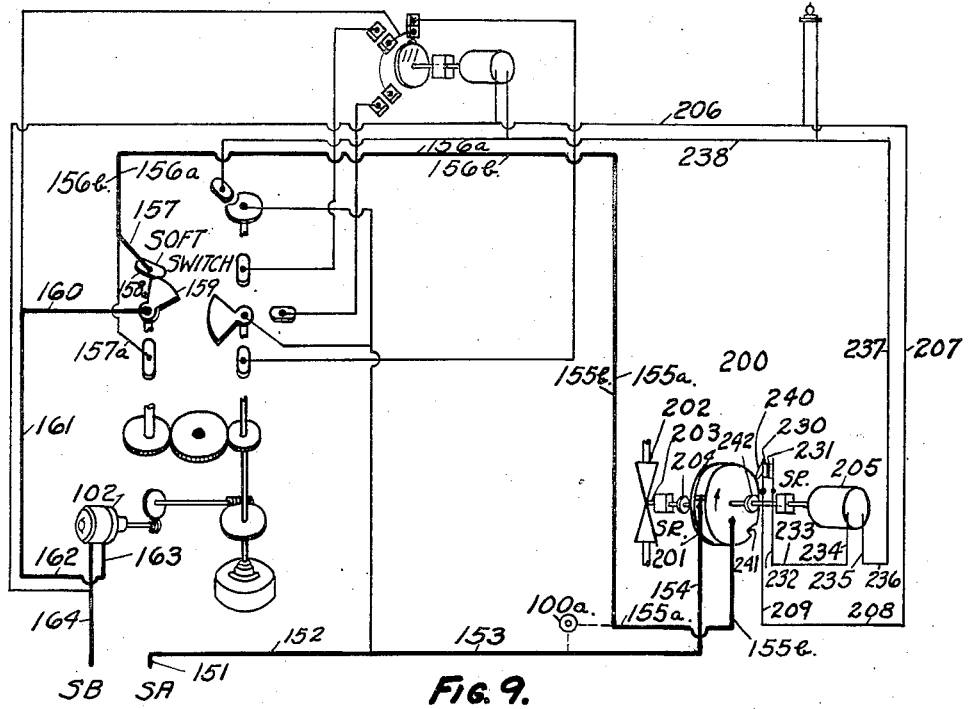

Figure 9 shows an arrangement of parts very similar to those shown in Figure 5, but in Figure 9 there is employed instead of the hand-operated switch for initiating the reconditioning cycle a second switching mechanism that is automatically actuated to closed position by a water meter so as to initiate the reconditioning cycle when a predetermined quantity of water has been softened. The arrangement of Figure 9 is that which is employed in what is properly designated as an electrical "full automatic" softener; the arrangement also includes an electric motor, to wit, one which may be termed a third motor associated with the said automatically closed switch whereby after the reconditioning cycle has been initiated by the automatic closing of the switch the movable member thereof can also be automatically set to zero position by the said electric or third motor. This figure, the same as Figure 5, shows the arrangement which the parts occupy during normal water softening period.

Figure 10:
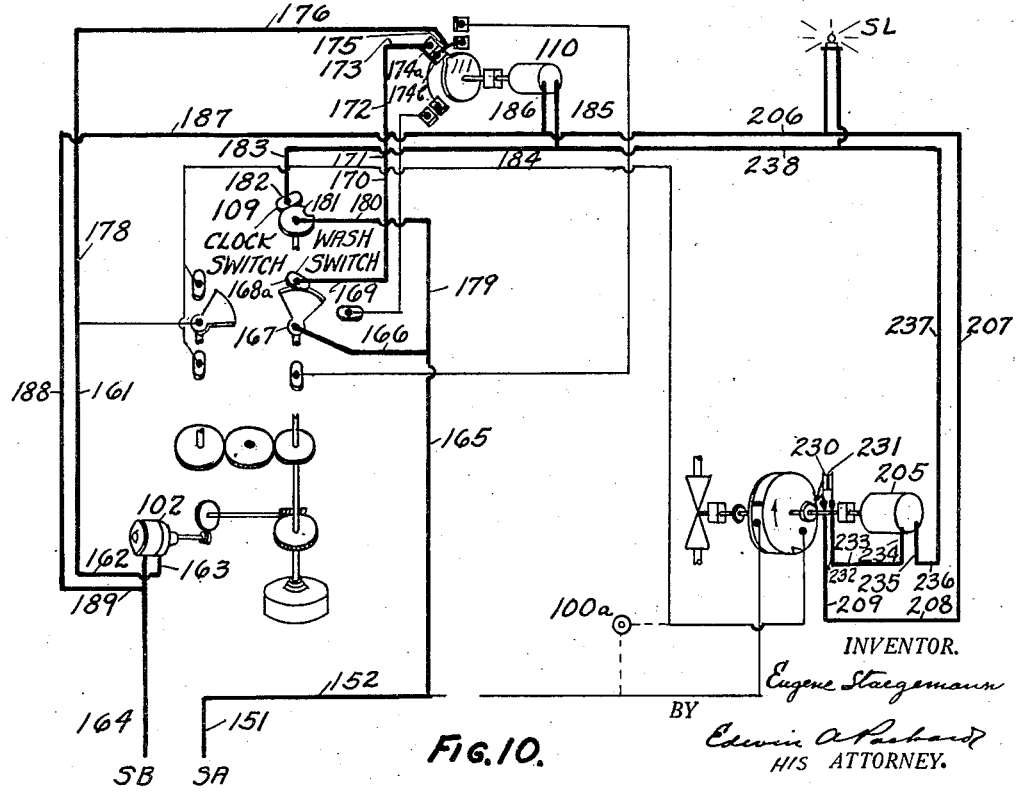

Figure 10 is an arrangement of the parts shown in Figure 9 but in a position which they occupy during a backwashing period.

Figure 11:
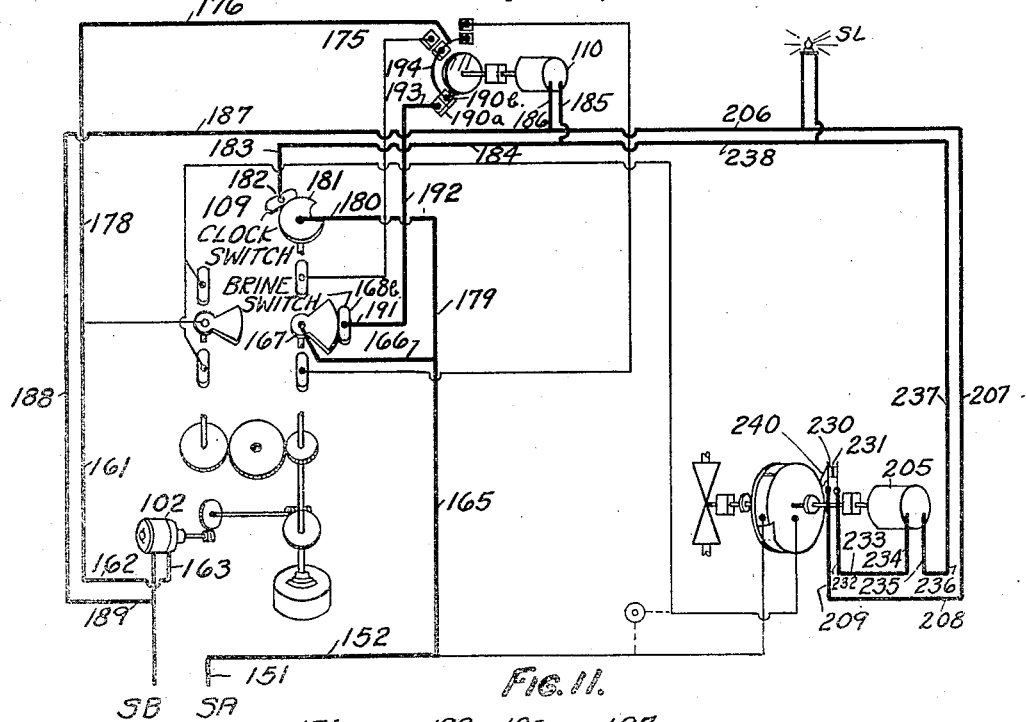

Figure 11 is an arrangement of the parts as shown in Figure 9 but in a position which they occupy during a brining or regenerating operation.

Figure 12:
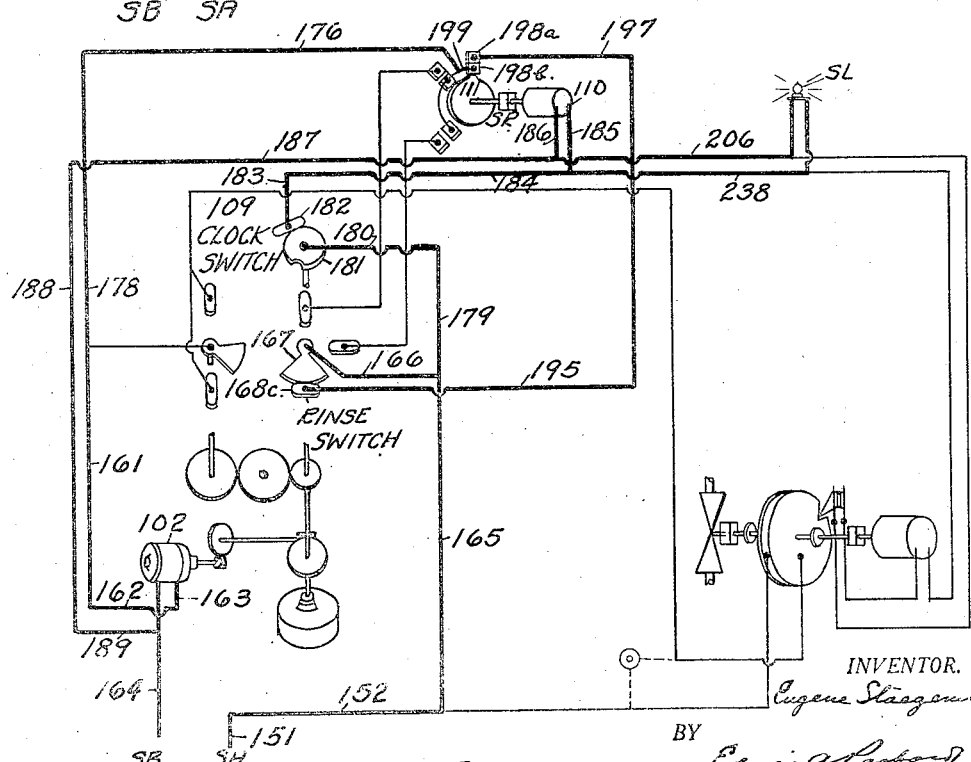

Figure 12 is an arrangement of the parts shown in Figure 9 but in a position which they occupy during the rinsing operation.

Figure 13:
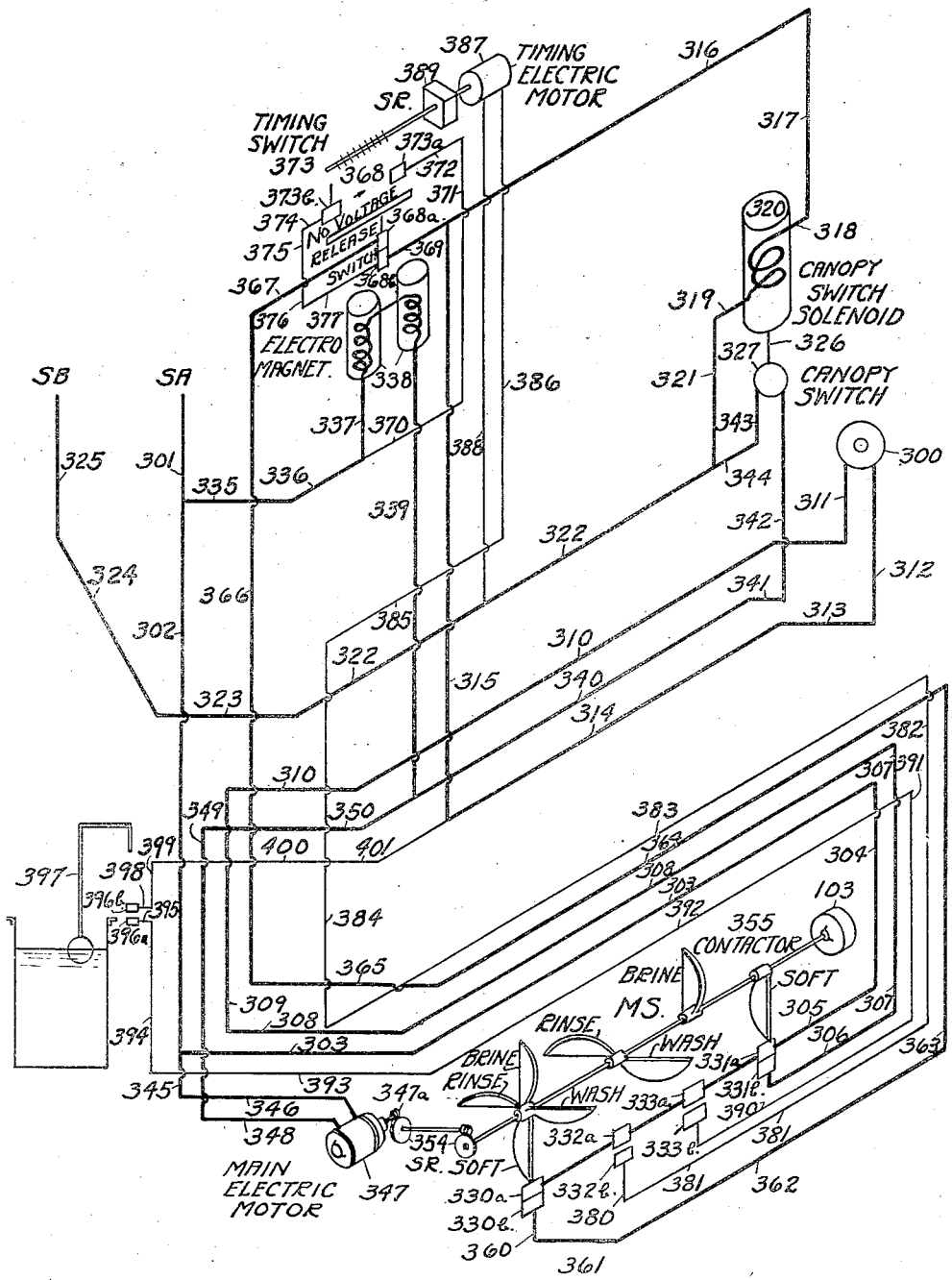

Figure 13 shows a system for an electric semi-automatic softener the effective functioning of which is quite similar to that of the arrangement of Figures 5 to 8 inclusive. In the arrangement of said Figures 5 to 8 after the reconditioning cycle has been initiated the succeeding steps are under the control of the secondary electric motor which is a timing motor and the secondary switching member controlled thereby. According to the arrangement of Figure 13 the reconditioning cycle is initiated by a secondary switching mechanism, to wit, by an outside starting-up switch or hand-operated switch so that at the outset there is completed the circuit or arrangement whereby the main electric motor operates to move the cock or valve mechanism to backwashing position. Also in the arrangement of Figure 13 a timing motor comes into play to establish operations of the main motor so as to operate said main motor to move the cock or valve mechanism at one time from backwashing position to brining position and at another time from rinsing position to normal softening position. In order to move the valve from brining position to rinsing position an electric circuit or arrangement is established by the closing of a secondary switch that is under the control of a float in the brine tank and which secondary switch or brine switch, as it may be called, is completed when a definite quantity of brine has been withdrawn from the brine tank and passed to the base exchange material to be regenerated. The arrangement of Figure 13 is that which the parts occupy during a nomal water softening period.

Figure 14:
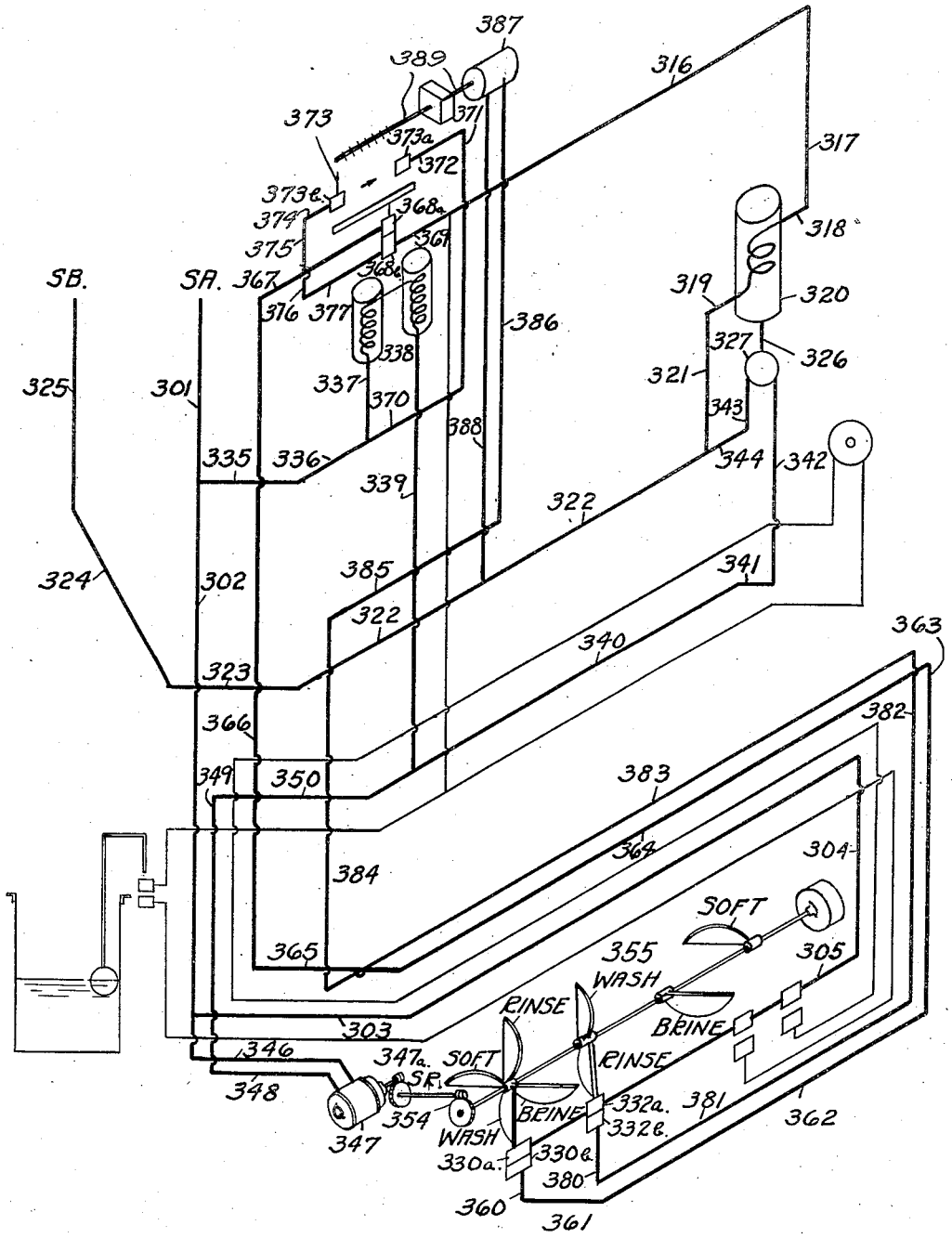

Figure 14 is an arrangement of parts as shown in Figure 13 but in a position which they occupy during a backwashing operation.

Figure 15:
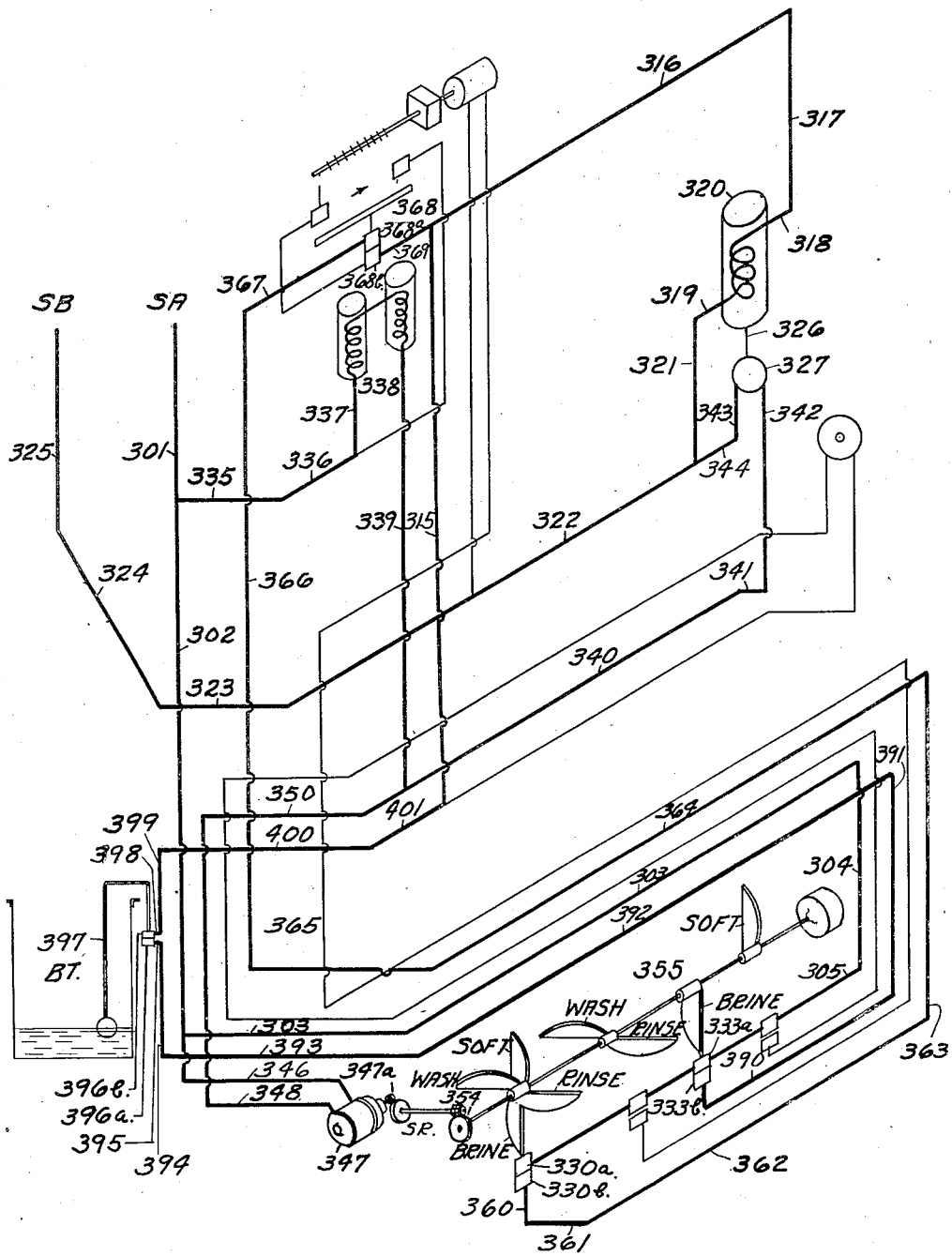

Figure 15 is an arrangement of parts as shown in Figure 13 but in a position which they occupy during a brining operation.

Figure 16:
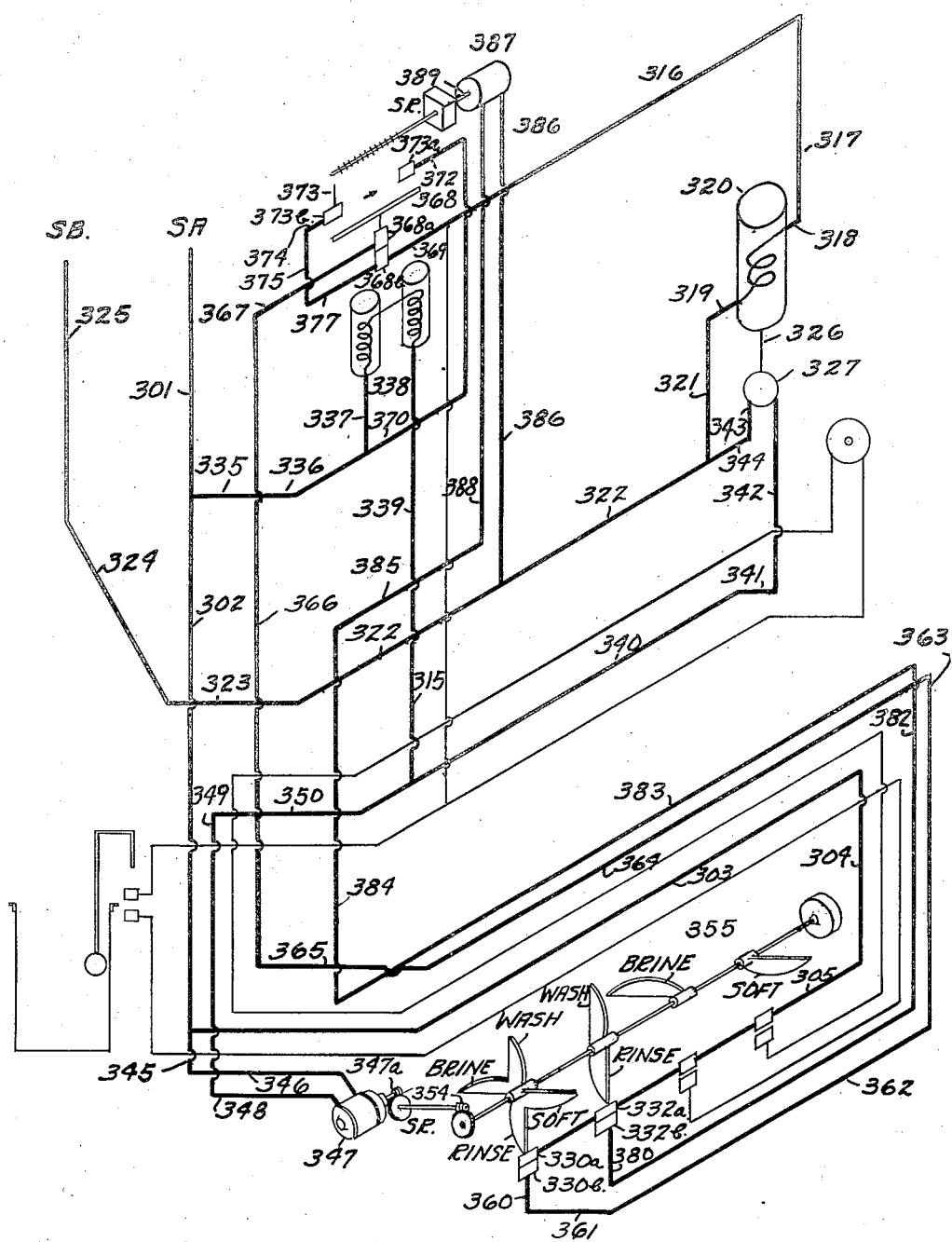

Figure 16 is an arrangement of parts as shown in Figure 13 but in a position which they occupy during a rinsing operation.

Figure 17:
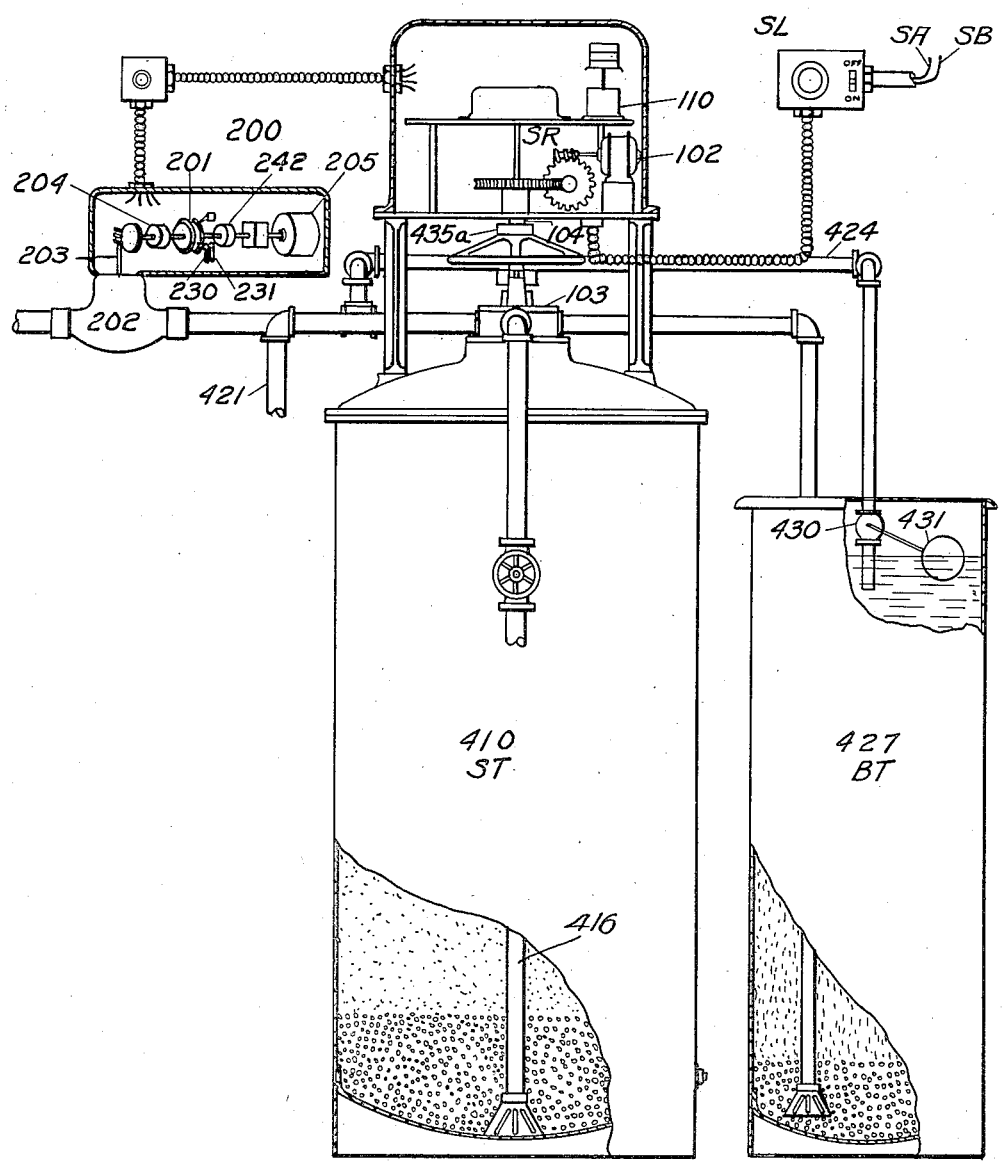

Figure 17 is a general arrangement or view in vertical section, partly in elevation, of a water treating apparatus, to wit, a water softening apparatus having a softening tank with a bed of base exchange material or zeolite therein through which the water to be softened passes and which apparatus is provided with a multiple-way valve, a brine tank, and the electric system or arrangement of Figures 9 to 12 inclusive whereby several operative phases of the apparatus, to wit, the softening, backwashing (sometimes referred to as washing), regenerating and rinsing are automatically and successively carried out. In other words, the construction and arrangement of the apparatus of this figure is such that a cycle for the reconditioning of the zeolite is automatically initiated to terminate the softening so that there follows the rest of the steps of the reconditioning cycle and the restoration of the apparatus to normal softening arrangement.

Figure 18:
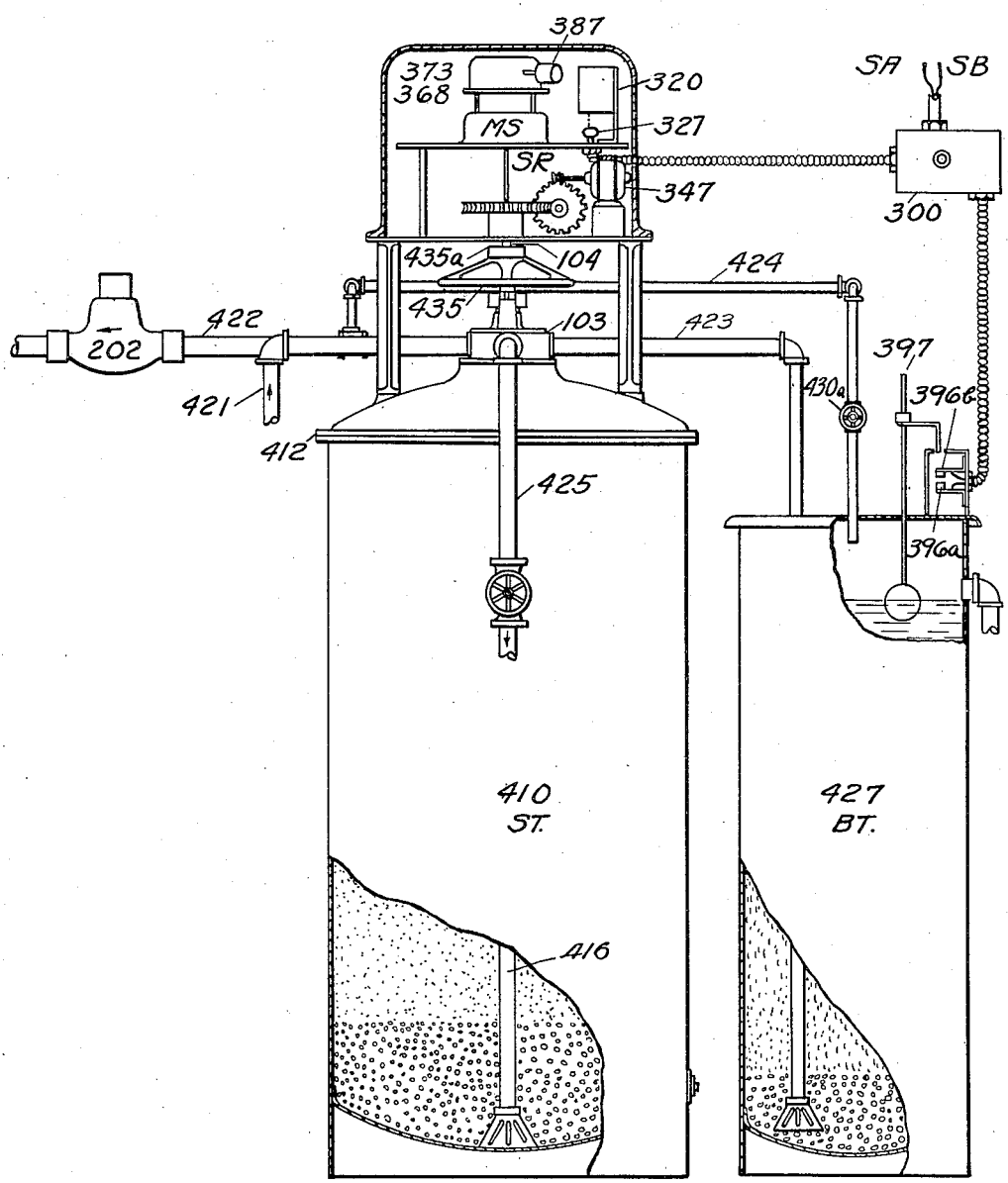

Figure 18 is a general arrangement view of a water softening apparatus similar to that of Figure 17 but in the apparatus of Figure 18 instead of being full automatic there is employed an electric semi-automatic arrangement such as that of Figures 13 to 16 inclusive.

Figure 19:
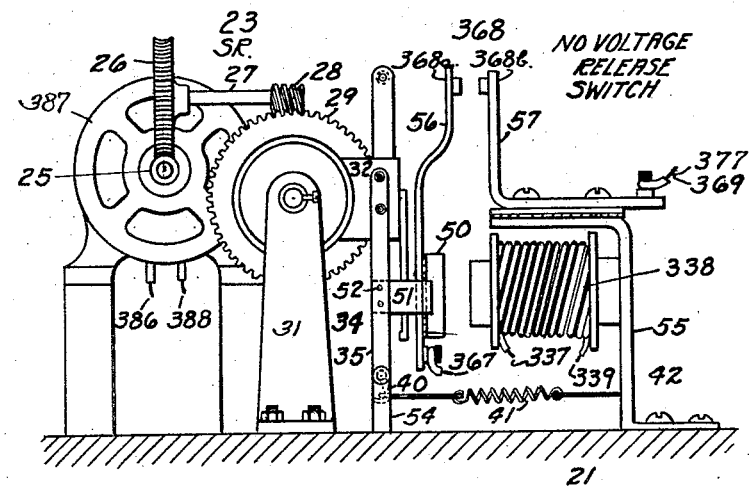
Figure 20:
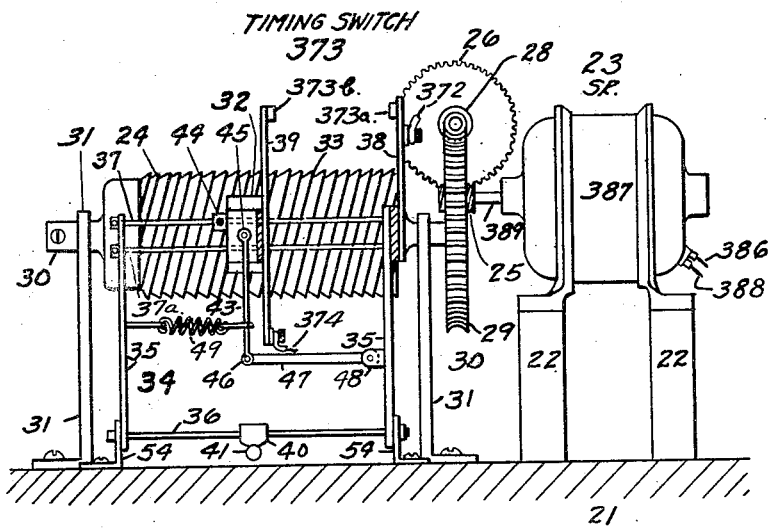

Figures 19 and 20 are, respectively, end and sectional elevational views of a unit that combines a no-voltage release switch, a time (secondary) switch and a timing electric motor such as employed in the electric semi-automatic system or arrangement of Figures 13 to 16 inclusive.

Figures 21 to 26 are views illustrating the four position valve or cock employed in the water softening apparatus of either Figure 17 or Figure 18. Of these, Figure 21 is a vertical section on the planes of the broken lines B—B of Figure 23 looking in the directions indicated by the arrows.

Figure 22 is a vertical section on the plane of line C—C of Figure 23 looking in the direction of the arrows.

Figures 23, 24, 25 and 26 are horizontal sections on the planes of line A—A of Figure 21, the valve being shown, respectively, in softening, backwashing, regenerating and rinsing positions.

Figure 27:
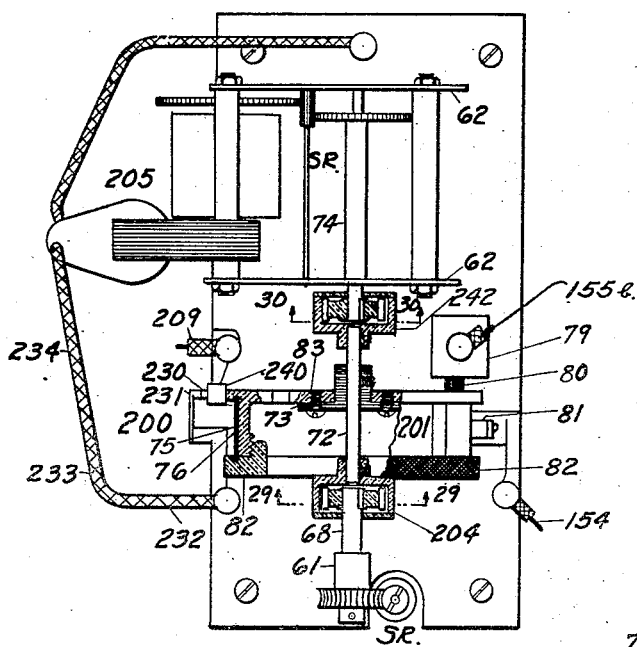

Figure 27 is a plan view, partly in section, of the motor controlled secondary switch employed in the full automatic electric arrangement of Figures 9 to 12 inclusive.

Figure 28:
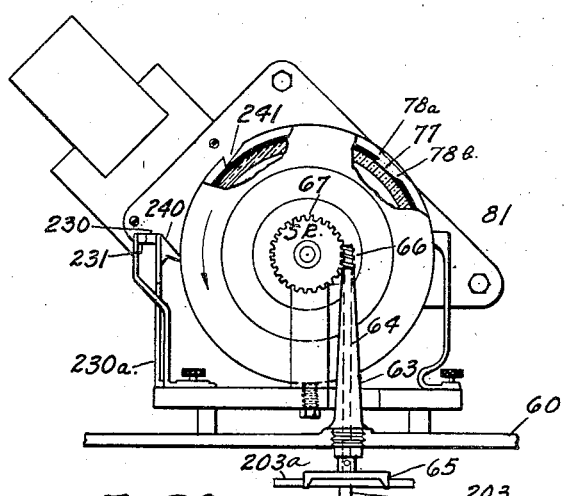

Figure 28 is an end elevation, partly in section, of the motor controlled secondary switch of Figure 27. In Figures 27 and 28 the parts are shown on a larger scale than in Figures 9 to 12 inclusive.

Figure 30:
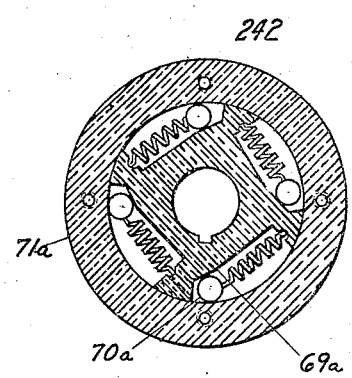
Figure 29:
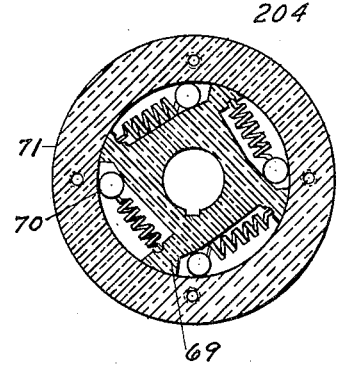

Figures 29 and 30 are sectional views of the one-way driving clutches employed in connection with the motor controlled secondary switch of Figures 27 and 28. Figure 29 is a view taken as on a vertical plane indicated by line 29—29 of Figure 27 looking in the direction of the arrows. Figure 30 is a view taken as on a vertical plane indicated by line 30—30 of Figure 27 looking in the direction of the arrows.

Figure 31:
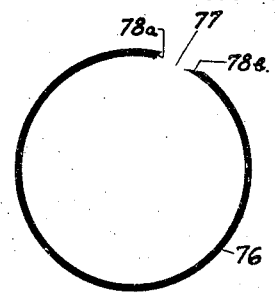

Figure 31 is a side or edge view of an electric insulating strip or band employed on the movable contact member of the secondary switch of Figure 27.

Reference will now be made to the drawings in detail.

Figure 1:
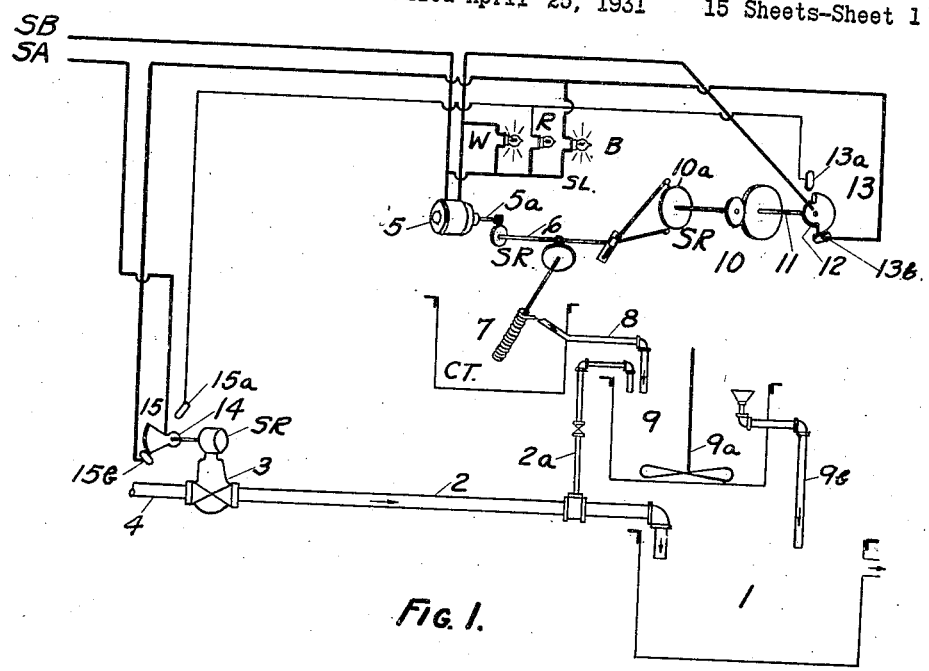
Figure 2:
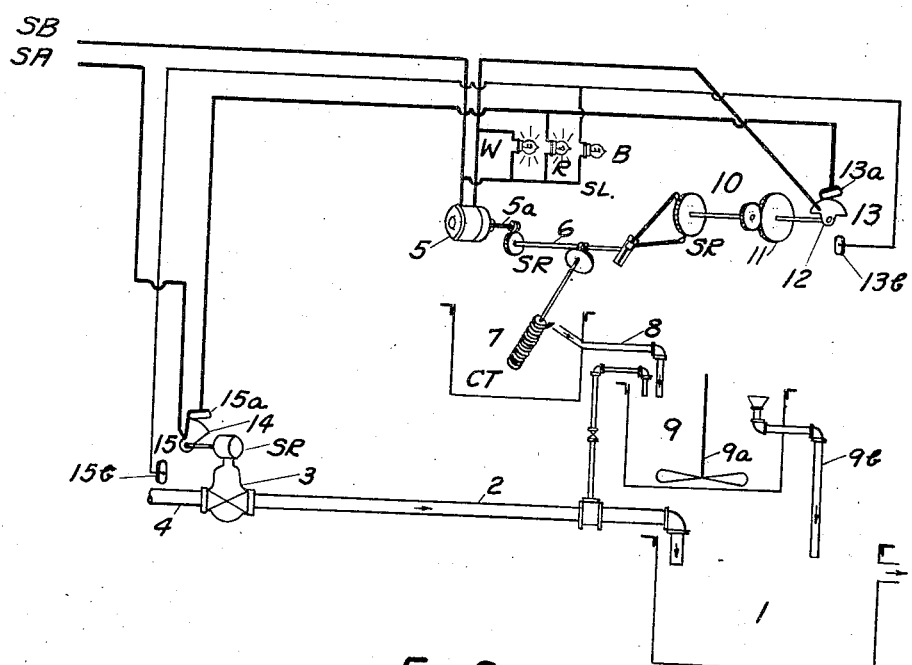
Figure 2 is a diagrammatic arrangement similar to that of Figure 1 but with the parts in an operative position succeeding that which is shown in Figure 1.

*Arrangement of Figures 1 and 2*

The water treating apparatus as a whole comprises such members as a water receiving tank 1 which is supplied with water as from pipe 2 which enters into tank 1 and which pipe 2 leads water from meter 3 that is in turn supplied with water from pipe 4. The water treating apparatus also comprises an intermittently operated main electric motor 5 having a driven member, to wit, rotor 5a, which through suitable reducing gearing, as 6, drives a spiral pump 7 that delivers the required quantity of acid from a chemical tank CT to a trough, as 8, leading to a mixing tank 9 that empties through an over-flow pipe 9b into the water receiving tank 1. This mixing tank 9 is supplied with water from a branch line 2a and is also provided with suitable means as a stirrer 9a for effecting a uniform mixing of the acid with the water supplied to the tank. The driven member or rotor 5a in turn drives therefrom, through the reducing gearing 6 and through adjustable feeding mechanism broadly indicated by 10 but which includes an adjustable feed regulating device indicated by 10a, a driven member 11 which positions and drives a movable circuit disrupting member or contactor 12 constituting a part of a main controlling switching mechanism 13.

The construction of this main switching mechanism 13 is such that it has a plurality of relatively stationary contacts, as 13a and 13b, and is comprised in a plurality of—to wit two—electrical circuits, one of which functions at one time when closed to cause the operating or functioning of the main electric motor 5, the other of which circuits functions at a succeeding time when closed to cause the operating or functioning of the main electric motor 5. In this main switching mechanism 13 the construction is also such that the contactor serves to disrupt the motor circuit after the rotor of the motor has made or turned a predetermined number of revolutions but so that while the contactor 12 disrupts one circuit and establishes a closing position for a succeeding circuit, viz., assumes a closing position for a succeeding circuit which is later to be established, as will hereinafter appear, when a circuit completing switch or secondary switching mechanism is closed.

Reverting now to the water meter 3, this is in effect a secondary motor which in turn operates and drives a second driven member, to wit a movable contact 14 of a secondary switch 15 that has relatively stationary contacts 15a and 15b. The function of this secondary switch is to establish or complete at the proper time and after a proper quantity of water has passed through the meter a circuit that includes that portion of the main switching mechanism 13 which is then closed whereby the circuit through the main electric motor 5 will be established and will continue until the circuit is broken by the movable circuit disrupting member or contactor 12 breaking the circuit as will be described.

Refer to Figure 1 and consider for example that the movable contact 14 of this secondary switch 15 has just engaged the relatively stationary contact 15b. The main electric motor circuit shown in heavy black lines is thus completed and the motor starts to operate; that is, to pump strong acid whereby the desired quantity ultimately reaches the water passing to the tank 1. After the required number of revolutions of the motor—this being dependent upon the adjustment of the adjustable feed mechanism 10,—the movable disrupting member or contactor 12 moves from engagement with the contact member 13b but into engagement with the contact member 13a, with the result that the heavy line circuit is disrupted at 13b but a closed position for the main switch is established at 13a for the circuit shown in heavy black line of Figure 2.

Referring now to Figure 2, it will be seen that the heavy black line circuit of this figure is not completed until the movable contact 14 of the secondary switch 15 is moved by the water meter 3 serving as a motor into engagement with the relatively stationary contact 15a, thus completing the heavy black line circuit of Figure 2 and starting the operation of the main electric motor which functions until the circuit is disrupted by the movable disrupting member 12 leaving the relatively stationary contact 13a and establishing a closed position with contact 13b for the succeeding circuit—to wit, the heavy black line circuit of Figure 1—that is to be subsequently completed by the movable contact 14 of the second or circuit completing switch 15. In other words, the circuit disrupting member 12 actually assumes a closed position with the main switching mechanism 13 before leaving the contact 13a and vice versa. It will be noted that in the electric system of these figures there have been included signal lights, such as a red light R, a white light W and a blue light B that bridge certain wires of the circuits whereby these lights serve as visual means for indicating which of the circuits are alive or dead; in other words to indicate which of the circuits are or are not functioning at a particular time; these lights also indicate the frequency of the circuit changes. It will, therefore, be clear that the arrangement of Figures 1 and 2 show the two circuits and the different functional positions of the members comprised therein and constituting parts thereof.

Figure 3:
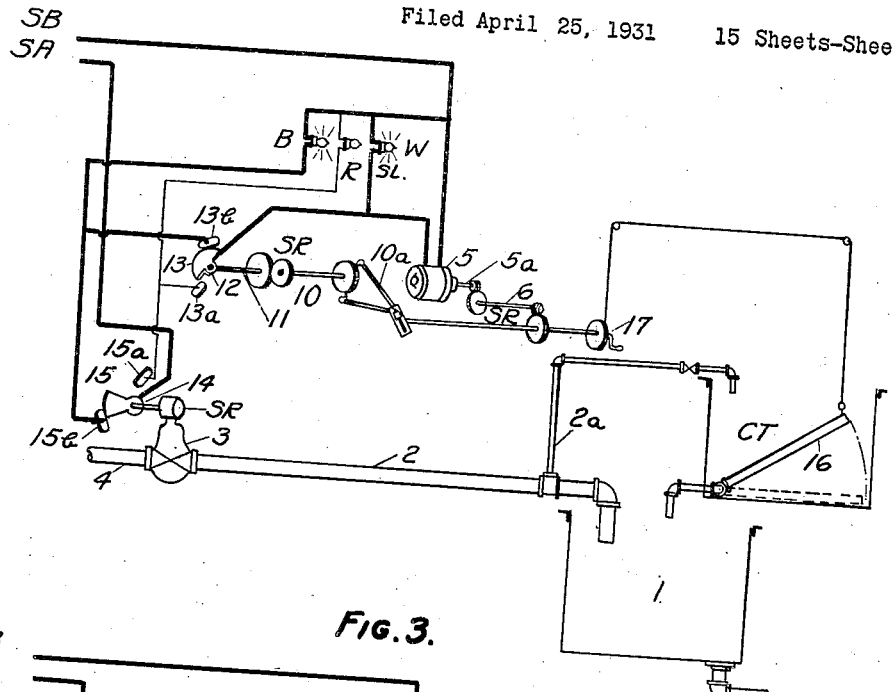
Figure 3 is a diagrammatic view showing an arrangement very similar to that of Figure 1, but in Figure 3 there is employed instead of the Archimedean screw pump a pipe raised by hand and automatically lowered to provide means for delivering a quantity of chemical, such as lime soda solutions, to the water to be treated and in proportion to the quantity of water being treated.
Figure 4:
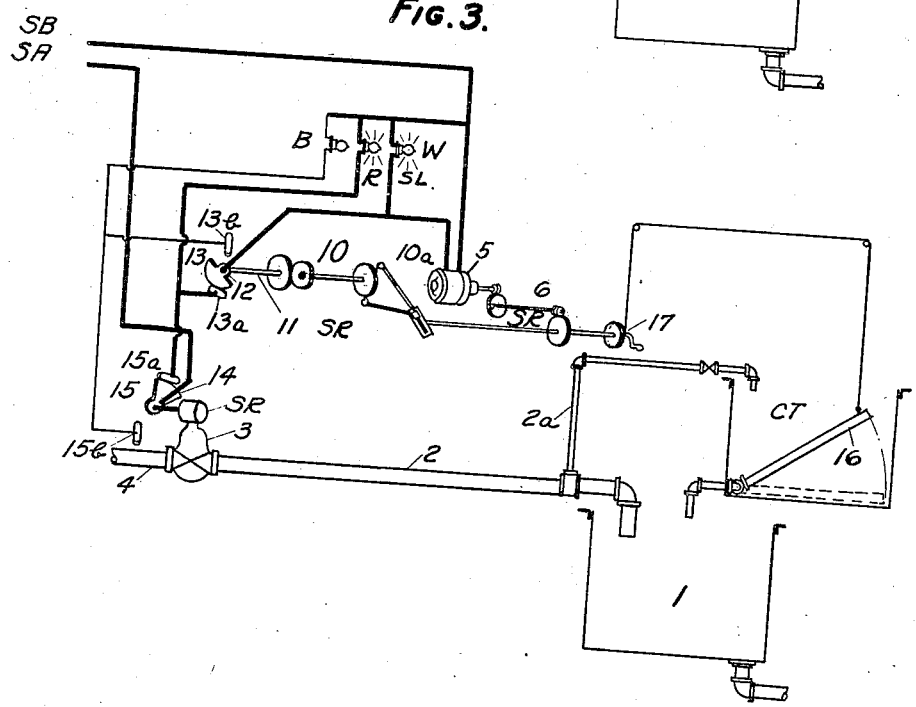
Figure 4 is a diagrammatic arrangement similar to that of Figure 3 but with the parts in operative position succeeding that shown in Figure 3.

*Arrangement of Figures 3 and 4*

The apparatus of Figures 3 and 4 is much the same in function as that of Figures 1 and 2 except that in the apparatus of Figures 3 and 4 there is employed a swing pipe 16 one end of which is raised by hand and progressively lowered by suitable mechanism, as at 17, which is under the control of the main electric motor 5. This pipe 16 is for conducting from chemical tank CT a chemical, for example lime soda solutions, direct to the tank 1 containing water to be treated. According to the arrangement of Figures 3 and 4, the chemical is initially mixed in the chemical tank CT with water supplied thereto intermittently and under manual control through branch line 2a; otherwise than as indicated the arrangement of Figures 3 and 4 practically corresponds to that of Figures 1 and 2 and the same reference characters and description apply to each.

*General—Re the arrangement of Figures 1 and 2 and of Figures 3 and 4*

It will be here noted that if the water to be treated is supplied at a uniform rate to the tanks of the arrangement of Figures 1 and 2, or Figures 3 and 4, then it is feasible to substitute for the water meter, which is a flow meter, any suitable timing meter as a time clock to serve as the medium for controlling the successive and periodic closing of the secondary switch 15. From what has preceded it will be manifest that in the normal functioning of the water treating apparatus of Figures 1 and 2 or of Figures 3 and 4 there is a plurality of circuits which are successively completed and which are controlled as to completion and disruption by cooperating main and secondary switching mechanisms, the main switching mechanism of which is always in a closed position for one of the circuits, to wit, the circuit which is subsequently to be completed by the movement to closing position of the secondary switch closing contact which is moved to closing position by a second motor, to wit, the water meter or water motor 3.

The main electric motor 5 through rotor 5a thereof actuates and drives the member of the water treating apparatus which may be broadly referred to as the driven member that controls or determines the functional characteristics of a water treating apparatus, to wit, a member such as the spiral pump 7 of Figures 1 and 2 or the swing pipe 16 of Figures 3 and 4, and when the required movement has been imparted to the member thus functioning the motor is stopped by the disrupting member or contactor 12 which is also driven by the rotor of the main electric motor. As previously pointed out, it will be noted that this disrupting member or contactor 12 causes not only the disrupting of the motor circuit but also moves to closing position certain contact members of the main switch whereby the succeeding circuit can subsequently be established by the closing of the secondary switching mechanism.

In the arrangement of Figures 1 to 4 and also in other figures of the accompanying drawings there is indicated suitable reducing gearing, designated SR, between a driving motor, to wit, either the water meter or timing electric motor or main electric motor on the one hand, and a mechanism or mechanisms and/or member or members driven thereby on the other hand.

*Electric semi-automatic softener*

The electric system or arrangement of Figures 5 to 8 inclusive relates to electric semi-automatic softeners. In the arrangement of Figure 5, when the movable member 101 of the external hand-operated switch 100 is swung to the left there is established a circuit which may be referred to as the "backwashing setting circuit or arrangement" and from the operation of the arrangement of Figure 5 there follows the arrangement of Figure 6 which may be referred to as the "brine setting circuit or arrangement". From the operation of Figure 6 there follows the arrangement of Figure 7 which may be referred to as the "rinsing setting circuit or arrangement", and from the operation of Figure 7 there follows the arrangement of Figure 8 which may be referred to as the "softening setting circuit or arrangement". Each of these arrangements will be separately considered.

*Backwashing setting circuit or arrangement (Figure 5)*

The swinging to the left of the movable member or contact 101 of the secondary switching mechanism, to wit, the external hand-operated switch 100, closes and initiates a circuit which may be referred to as the "main motor circuit" and which includes besides the secondary switch 100 also the main electric motor 102 and the closed members of the main switching mechanisms MS. When this circuit is completed it starts the main electric motor 102 which then operates and drives a four position cock or valve mechanism 103 until the latter is in a position for the backwashing operation to be carried out.

*Main motor circuit*

The main motor circuit established as above may be referred to as the first main circuit 1A and includes—source of electrical energy SA, wires 151, 152, 153, 154, movable contact 101, wires 155a, 156a, 157a, relatively stationary contact 158a, circuit breaker cam 159, wires 160, 161, 162, 163, main electric motor 102, wire 164, and source of electrical supply SB. If the main motor circuit is established by swinging contact 101 from left to right, then the circuit thus established may be referred to as the first main circuit 1B. This circuit 1B is exactly the same as circuit 1A above described with the exception that when circuit 1B is closed by throwing the external hand-operated switch contact 101 to the right there is included in the electric motor circuit wires 155b, 156b, 157b and relatively stationary contact 158b, in place of wires 155a, 156a, 157a and relatively stationary contact 158a.

It will be noted that this four position cock or valve mechanism 103 has a driven or control member 104 which in turn is driven from the rotor 102a of the main electric motor 102 through the medium of worm and worm-wheel reducing gearing constituting speed reducing means indicated by 105. It will be observed from the drawings that from the rotor 102a of the motor there is driven—indirectly through the reducing gearing—a set of circuit disrupting members collectively referred to as a disrupting contactor 106 which includes cam members, such as breaker cams or circuit disrupting cams 159 and 167, and which contactor through the medium of the cams thereof, cooperate with relatively stationary switching members or contact parts of what is known as the main switching mechanism collectively indicated by MS and the function of which contactor is to disrupt the main motor circuit after the main motor has turned the required number of revolutions to move to closing position certain contacts of the main switching mechanisms and which contacts in closing position are in the next or succeeding circuit by which the motor is to be operated or caused to be operated when the next or succeeding motor circuit is completed by the movement to closed position of the contacts of a secondary switch as hereinafter described.

A reference to Figure 5 will make it clear that the main electric motor circuit can be completed by a throwing of the outside hand-operated or secondary switch 100 and that the circuit thus completed includes breaker cam 159. This circuit is maintained until the contactor or circuit breaker cam 159 thereof leaves the relatively stationary contact 158a which may be referred to as the soft switch contact with which the breaker cam 159 was in engagement as shown in Figure 5, thus opening the soft switch. Just prior to the soft switch disengagement or circuit disruption which follows cam 159 leaving the soft switch contact 158a there is established a closing—as shown in Figure 6—of a part of the main switching contacts by breaker cam 167 engaging a relatively stationary contact 168a or what is known as the wash switch and which wash switch is a part of the main switching mechanism MS. Also, when the parts have moved from the position shown in Figure 5 to that shown in Figure 6 there is completed, by a switch known as the clock switch 109 which includes movable contact 181 and relatively stationary contact 182, a circuit that includes the electric clock or timing motor 110 and starts the operation of the latter.

*Brining setting circuit or arrangement (Figure 6)*

One should bear in mind that the wash switch 168a of the main switching mechanism is at this time closed and that the electric timing motor circuit has been completed.

*Timing motor circuit*

The electric motor or timing motor circuit which has been completed is as follows and includes—source SA, wires 151, 152, 165, 179, 180, movable contact 181, relatively stationary contact 182 (clock switch 109) wires 183, 184, 185, electric timing motor, that is electric clock 110, wires 186, 187, 188, 189, 164 and source SB.

When the electric clock or timing motor 110 has operated a certain period it effects a movement of the contact making device 111 actuated thereby to a position for closing or for causing an engagement of contact members 174a and 174b for a secondary switching mechanism, thus establishing a second or succeeding main electric motor circuit that includes wash switch contact 168a.

*Main electric motor circuit (second main circuit)*

The main electric circuit thus completed by the timing motor, secondary contact members 174a and 174b may be referred to as the second main circuit. It is as follows and includes—source SA, wires 151, 152, 165, 166, circuit breaker cam 167, relatively stationary contact 168a of the wash switch, wires 169, 170, 172, secondary switch contacts 174a, 174b, wires 175, 176, 178, 161, 162, 163, main electric motor 102, wire 164 and source SB.

The completion of this secondary main circuit causes the main electric motor to move the four position cock or valve mechanism 103 to brining position. Upon the valve mechanism reaching this position the motor circuit just described is disrupted by cam 167 leaving the wash switch 168a, but before this disruption occurred cam 167 engaged and closed brine switch 168b, as shown in Figure 7, so that the parts are now in position for the succeeding operation which is described in connection with Figure 7.

*Rinsing setting circuit or arrangement (Figure 7)*

It will be noted that the electric clock or timing motor circuit continues completed; in other words, the timing motor is operating and therefore after a certain period the clock or timing motor 110 causes the contact closing member 111 driven thereby to move from its previous circuit closing position for the secondary switch contacts 174a and 174b to circuit closing position for the secondary switch contacts 190a and 190b; to wit, where it closes a set of contacts that establishes a third main circuit that supplies the electrical energy for operating the main motor.

*Main electric motor circuit (third main circuit)*

The third main circuit completed as above indicated is as follows: source SA, wires 151, 152, 165, 166, movable circuit breaker cam 167, relatively stationary contact 168b of brine switch, wires 191, 192, 193, secondary switch contacts 190a, 190b, wires 194, 175, 176, 178, 161, 162, 163, main electric motor 102, wire 164 and source SB.

The motor thus operates to move the members to the position shown in Figure 8; in other words, it moves the cam 167 of the circuit disrupting member or contactor from the relatively stationary contact 168b of the brine switch to engagement with the relatively stationary contact 168c of the rinse switch. The third main motor circuit is thereby disrupted.

Softening setting circuit or arrangement (Figure 8)

The electric clock or timing motor circuit is still completed whereby the timing motor turns the contact closing member 111 driven thereby, to wit, the driven member of the secondary switching mechanism, from closing position in respect to the secondary switching contacts 190a and 190b to a closing position for the secondary switch contacts 198a and 198b and which closing of contacts 198a and 198b takes place after a period of time has elapsed and during which a rinsing operation is taking place. The closing of the contacts at 198a and 198b establishes the fourth main circuit.

Main electric motor circuit (fourth main circuit)

The circuit closed as above described includes the following: source SA, wires 151, 152, 165, 166, movable circuit breaker cam 167, relatively stationary rinse switch 168c, wires 195, 196, 197, secondary switch contacts 198a and 198b, wires 199, 176, 178, 161, 162, 163, main electric motor 102, wire 164 and source SB.

The closing of this fourth main circuit starts the main electric motor whereby the four position cock or valve mechanism 103 is turned further, back to its normal water softening position and when in this position the movable circuit breaker cams 167 and 159 are moved so that the main electric motor circuit is disrupted because the circuit breaker cam 167 leaves the contact 168c of the rinse switch; at the same time the relatively stationary member 182 of the clock switch snaps into the insulated recess of the cam 181 which at this time has been turned to the position shown in Fig. 5, thereby interrupting the timing motor circuit and stopping the timing motor 110. Just prior to the interruption of the fourth main motor circuit by cam 167 the movable breaker cam 159 of the contactor is moved into engagement with the contact 158b of the softening switch, thus closing the latter switch and placing the apparatus in readiness to be started again at will by manually throwing the movable switch member 101 to the right.

Timing motor signal

The electric clock or timing motor has across the terminals thereof a circuit that includes the electric light or signal light SL which can be used as a signal whereby a person can determine from a distance when the timing motor 110 is functioning.

Electric full automatic softener

The electric full automatic softener of Figures 9 to 12 inclusive functions in practically the same manner as the electric semi-automatic softener of Figures 5 to 8 inclusive, with the exception that in place of the external hand-operated switch 100 of Figures 5 to 8 there is employed a meter controlled and/or motor controlled switch 200. Therefore, the foregoing description which applies to the semi-automatic arrangement of Figures 5 to 8, with the exception just noted, applies also to the full automatic arrangement of Figures 9 to 12 inclusive. As above indicated, in place of the hand-operated or secondary switch and movable contact member 101 thereof of the semi-automatic water softener, there are substituted in the full automatic the meter controlled secondary switch 200 and the movable driven contact member 201 thereof. The water that is treated in the full automatic softening apparatus of Figures 9 to 12 on its way from the softening apparatus passes through the water meter 202 which is in effect a water motor that measures the water and also actuates the movable contact 201 of the switch 200 to close said switch when the desired quantity of water has passed through the meter; in other words, has passed through the water softening apparatus. The driven or movable contact member 201 of this switch is actuated from the driven shaft 203 of the meter, which shaft becomes a driving shaft, through the medium of a one-way driving clutch 204 and this clutch is constructed so that the movable contact member of the switch can be driven in a forward direction by the meter acting as a motor but so that the driven or movable contact member 201 of the switch can by another motor or clock 205 be driven for the purpose of setting the movable contact member of the switch to zero position after it has functioned to close the circuit controlled thereby for the purpose of starting the reconditioning cycle. When the water meter has moved the driven contact member 201 of the switch to circuit closing position it automatically establishes the reconditioning cycle and the reconditioning cycle described with respect to Figures 5 to 8 inclusive takes place in the arrangement of Figures 9 to 12 inclusive.

Reference has been made to the electric motor or clock as a means for setting the movable contact member 201 of the switch to zero position; such motor, as indicated by 205, is included in a circuit that is in electrical parallel with the electric clock or timing motor 110 previously referred to. The timing motor circuit that includes the electric motor 110 has previously been described under the heading "Backwashing setting circuit or arrangement of Figure 5" and the electric motor 205 is included in an electric circuit which, as above indicated, is in electrical parallel with the circuit that includes the electric timing motor 110. This parallel arrangement is effected by branch wiring leading from one wire of the timing motor 110 to motor 205 and from the latter back to another wire of the circuit of the timing motor 110; to wit, by branch wiring including—wires 206, 207, 208, 209, switch construction including switch contacts 230, 231, wires 232, 233, 234, electric motor 205, wires 235, 236, 237 and 238.

While the two electric motors just mentioned are in parallel relation still the electric motor 205 for setting to zero position the driven contact member 201 is included in the branch wiring so that the branch is automatically disrupted by switch contacts 230 and 231 being moved to open position when the electric motor 205 has moved the driven contact member 201 of the switch to zero position; in other words, contacts 230 and 231 are automatically moved to open position when member 240 drops into the notched portion 241 of the driven contact member 201. This electric motor 205 effects the movement of the driven member 201 of the switch through the medium of a one-way driving clutch 242 which functions only for the purpose of forwardly moving the driven member 201 of the secondary switch to zero position but which otherwise permits free forward driven movement of the movable member 201 of the switch by the water meter serving as a motor as the apparatus functions.

The construction of this movable member of the switch is such that the period for closing the circuit controlled thereby can be made dependent upon and followed according to the quantity of water it is desired to have passed through the water softening apparatus before effecting a reconditioning cycle. The outside switch 200 just described and which includes the movably driven contact member 201 may properly be referred to in broader terminology as one of the secondary switches relied upon to establish or complete a main motor circuit.

This full automatic arrangement as shown, is provided with a hand-operated switch, at 100a, which can be employed for initiating the reconditioning cycle, if desired to so employ it, but this switch 100a is not normally used nor required in the full automatic arrangement.

The motor controlled switch 200 previously referred to is shown in greater detail in Figures 27 to 31 inclusive and is also more specifically described in conjunction with said figures.

Electric semi-automatic arrangement of systems of Figures 13 to 16 inclusive This system is constructed so as to effect, when the reconditioning cycle has once been initiated, the successive automatic movement of a valve mechanism, such as a four position cock 103, through its successive steps; that is, from normal water softening position to backwashing position; thence to brining position, thence to rinsing position and finally to water softening position.

The system is such that the reconditioning cycle can be initiated merely by closing an outside starting-up or secondary switch 300 and, as above indicated, when once established the reconditioning cycle is carried on until the parts are in normal water softening arrangement. The closing, as by hand, of the starting-up or secondary switch causes a functioning of what may be termed the backwashing arrangement shown in Figure 13.

Backwashing setting arrangement (Figure 13)

The closing of this starting-up switch 300 completes the "starting-up solenoid circuit" which includes the following: source SA, wires 301, 302, 303, 304, 305, soft switch contacts 331a and 331b of the main switching mechanism and which contacts are thus held in closed position by soft cams of the circuit disrupting member or contactor 355, wires 306, 307, 308, 309, 310, 311, outside hand-closed starting-up switch 300, wires 312, 313, 314, 315, 316, 317, 318, canopy switch solenoid 320, wires 319, 321, 322, 323, 324, 325 and source SB.

It will thus be noted that this circuit includes the solenoid 320 and derives its name therefrom. This solenoid when energized lifts armature 326 and in turn closes canopy switch 327. The closing of this canopy switch 327 completes for its first time in the reconditioning cycle the main electric motor circuit.

Main electric motor circuit

The main electric motor circuit as completed is as follows and includes—source SA, wires 301, 302, 345, 346, main electric motor 347, wires 348, 349, 350, 340, 341, 342, canopy switch 327, wires 343, 344, 322, 323, 324, 325 and source SB. With the establishment of the main motor circuit there is also simultaneously completed a circuit identified as an electro-magnetic circuit because it includes an electro-magnet 338. This electro-magnetic circuit functions in parallel with the main electric motor circuit.

Electro-magnetic circuit

The electro-magnetic circuit thus completed is as follows and includes—source SA, wires 301, 335, 336, 337, electro-magnet 338, wires 339, 340, 341, 342, canopy switch 327, wires 343, 344, 322, 323, 324, 325, and source SB. The electro-magnet 338 is in fact part of a no-voltage release switch 368 and upon being energized instantly closes the no-voltage release switch that comprises contacts 368a and 368b, whereby there is established a second or auxiliary circuit for the solenoid 320 and which circuit is termed "no-voltage release solenoid circuit" and includes the contacts just mentioned, the canopy switch solenoid 320 and contacts 330a and 330b of the main switch which are retained in closed position by the movable contactor or circuit disrupting member 355 of what may be termed the main switching mechanism collectively referred to as MS. At this time contacts 330a and 330b, also contacts 331a and 331b are held in closed position by the soft cams of the contactor.

*No-voltage release solenoid circuit*

The no-voltage release solenoid circuit is as follows and includes—source SA, wires 301, 302, 303, 304, 305, main switch contact members 330a and 330b, wires 360, 361, 362, 363, 364, 365, 366, 367, no-voltage release switch contact members 368a and 368b, wires 369, 316, 317, 318, canopy switch solenoid 320, wires 319, 321, 322, 323, 324, 325 and source SB. The function of the circuit last mentioned is to insure a maintaining of the switches of the solenoid 320, even though the starting-up switch has been released by the operator. In this way the armature 326 of the canopy switch 327 is maintained in elevated position until the main electric motor 347 is actually started and until the motor moves the main switch contactor 355 and the breaker cams thereof, to wit, from contacts 330a and 330b and also from contacts 331a and 331b. A note is here injected calling attention to the fact that the motor 347 effects the movement of the contactor 355 and the four position cock or valve mechanism 103 through the medium of suitable speed reducing gearing 354 which is driven by the rotor 347a of the motor and which in turn imparts a reducing speed movement to the contactor 355 and the four position cock or valve which moves in harmony with the contactor. The motor continues to operate because of the switch parts of the canopy switch still remaining closed and this switch remains closed until the motor has moved the valve mechanism 103 controlled thereby to its required position for the backwashing operation and when in this position the movable contactor 355 has brought another cam mechanism, to wit, a set identified as wash cams, into closed position for two circuits. One of these circuits is the no-voltage release solenoid circuit previously described and includes the no-voltage release switch contacts 368a and 368b, the solenoid 320 and two contact members 330a and 330b of the main switch. The closing of this circuit effects a reenergizing of the canopy switch solenoid 320 which again lifts the armature 326 and this time the lifting of the armature transmits a pull to the canopy switch to open the switch parts and effects a disrupting of the motor circuit controlled thereby, the disrupting of the parallel electro-magnetic circuits and the consequent opening of the no-voltage release switch because of the opening of contact parts 368a and 368b whereby there results a breaking of the circuit that includes the canopy switch solenoid 320, thus leaving all parts dead with the exception of another circuit, to wit, the timing motor circuit that is closed at 332a and 332b by one of the wash cams.

*Brining setting arrangement (Figure 14)*

The motor has now brought all the parts to position shown in Figure 14 and it will be noted that the contact is now through the medium of the wash cams holding in closed position the main switching contacts 330a and 330b and also the main switch contacts 332a and 332b, to wit, the circuit termed "timing motor circuit" because it includes the timing motor and supplies the electrical energy for operating the same.

*Timing motor circuit*

The timing motor circuit is as follows and includes—source SA, wires 301, 302, 303, 304, 305, main switch contacts 332a and 332b held in closed position by a wash cam, wires 380, 381, 382, 383, 384, 385, 386, timing electric motor 387, wires 388, 322, 323, 324, 325, and source SB.

The timing motor 387 actuates through rotor 389 thereof a driven member which in turn serves to position a movable contact 373b that is associated with contact 373a of a secondary time switching mechanism 373 so that upon the lapsing of a required period of time, to wit, at the end of a backwashing period a circuit identified as "time switch solenoid circuit" is closed through the sets of contacts 373b and 373a and which circuit includes contacts 368a and 368b of the no-voltage release switch and canopy switch solenoid 320.

*Time switch solenoid circuit*

The time switch solenoid circuit includes—source SA, wires 301, 335, 336, 370, 371, 372, time controlled switch contacts 373a and 373b, wires 374, 375, 376, 377, contact 368b of no-voltage release switch 368, wires 369, 316, 317, 318, canopy switch solenoid 320, wires 319, 321, 322, 323, 324, 325, and source SB.

The energizing of the canopy switch solenoid lifts the armature, closes the canopy switch, thus again closing the main electric motor circuit thereby starting the motor and also initiating the parallel electro-magnetic circuit that includes the electro-magnets 338. The energizing of this set of magnets 338 causes, as will be described later in connection with Figs. 19 and 20 an instantaneous disruption of the time switch solenoid circuit, closed by the movable contact 373b, energizing its companion contact 373a, but instantly establishes the no-voltage release solenoid circuit previously described, to wit, the circuit through the no-voltage release switch contacts 368a and 368b whereby there is established the circuit that includes said no-voltage release switch contacts 368a and 368b, canopy switch solenoid 320 and contacts 330a and 330b of the main switch whereby the motor continues to operate until it breaks both circuits; namely, the no-voltage release solenoid circuit and also the timing motor circuit, the former of which includes the canopy switch solenoid 320 and the latter the timing motor 387. The main electric motor 347 is running and continues to operate (as the canopy still remains closed) and moves the valve mechanism controlled thereby the brining position by which time it has also moved the contactor 355 and brining cams thereof so as to move the main switch contacts 330a and 330b and also main switching contacts 333a and 333b to circuit closing position (see Fig. 15). Upon the brining cams functioning for closing the main switch contact controlled thereby there results a completion of the no-voltage release solenoid circuit and a consequent reenergizing of the canopy switch solenoid 320 because the circuit through the main switch contacts 330a and 330b is completed when said contacts closed. The reenergizing of the canopy switch solenoid 320 lifts the armature and lifts the canopy switch 327, causing it to open, thus stopping the main electric motor 347 and all parts of the system are restored to normal position, except there are held in closed position not merely contacts 330a and 330b but also contacts 333a and 333b of the main switch. At this time no circuit is completed.

*Rinsing setting arrangement (Figure 15)*

As just indicated all of the circuits of this arrangement are now dead and the main electric motor is not running. There is a set of secondary contacts 396a and 396b, sometimes referred to as brine secondary switching contacts. The function of these contacts is controlled by a float 397 in the brine tank BT which float is so arranged with respect to said last mentioned secondary contacts that it is adapted to engage the upper contact 396b so that when the proper quantity of brine has been withdrawn from the tank and passed to the zeolite bed in the softening tank ST of the water softening apparatus (See Fig. 18) the float then in its lower position will automatically cause a closing of the brine secondary contacts and thus complete a circuit herein referred to as brine controlled solenoid circuit which circuit includes besides the brine switch contacts just mentioned the main switch contacts 333a and 333b and the solenoid 320 which operates the canopy switch.

*Brine controlled solenoid circuit*

The brine controlled solenoid circuit is as follows and includes—source SA, wires 301, 302, 303, 304, 305, main switch contacts 333a and 333b now held closed by brine cams of contactor 355, wires 390, 391, 392, 393, 394, 395, brine secondary switch contacts 396a and 396b when the brine is dropped sufficiently to effect closing of these contacts, wires 398, 399, 400, 401, 315, 316, 317, 318, canopy switch solenoid 320, wires 319, 321, 322, 323, 324, 325 and source SB. The closing of this circuit causes an instantaneous lifting of the armature of the solenoid 320 and a consequent moving of the canopy switch 327 to closing position for the main electric motor circuit previously described with the result that said circuit is established and therewith there takes place the immediate establishment of the parallel electromagnetic circuit previously described, thus effecting a closing of the no-voltage release switch 368 and the establishment of the no-voltage release solenoid circuit previously described and which last mentioned circuit includes not only the contacts 330a and 330b of the main switch but also the no-voltage release switch 368 and the canopy switch solenoid 320. The main electric motor 347 is started as the result of the energizing of the solenoid 320 and the consequent closing of the canopy switch. The main electric motor moves the contactor 355 so that both the brine controlled circuit and the no-voltage release solenoid circuit are disrupted; there follows the deenergizing of the canopy switch solenoid 320 and the dropping of the armature but the canopy switch still remains closed whereby the motor continuously functions until the valve mechanism or four position cock 103 is moved to position for rinsing and at which time the rinsing cams of the contactor 355 are brought into position to close the main switch contacts 330a and 330b and also switch contacts 332a and 332b. There is thus reestablished the no-voltage release solenoid circuit that includes contacts 330a and 330b, the no-voltage release contacts 368a and 368b and the canopy switch solenoid 320 whereby the latter is reenergizing with the consequent lifting of the armature effecting the disrupting of the main electric motor circuit by the opening of the parts of the canopy switch 327. At this time all circuits of the system are dead with the exception of the circuit closed by contacts 332a and 332b, (See Fig. 16) to wit, the timing motor circuit that includes besides the contacts 332a and 332b the secondary or timing motor 387.

*Softening setting arrangement (Figure 16)*

As above indicated, all circuits in this figure are dead, with the exception of the timing motor circuit which is closed by the main switch contacts 332a and 332b by the rinse cams. Said timing motor is thus operating during the rinsing period; in fact the length of the rinsing period is determined by this motor. During this rinsing period water is passed through the apparatus to waste in order to remove any excess brine remaining in the base exchange material or zeolite bed after the brining operation. During a proper period of time this timing motor 387 through rotor 389 thereof moves the movable contact 373b, indirectly driven thereby, to a position for closing a circuit through the set of secondary time switching contacts 373b and 373a; in other words, at the end of the proper period for rinsing the time controlled circuit is established that includes said set of contacts 373a and 373b and also the canopy switch solenoid 320 whereby the latter is energized thus lifting the armature 326 thereof and moving the parts of the solenoid switch 327 to closed position, thus simultaneously establishing the main electric motor circuit and also the parallel electro-magnetic circuit, to wit, the circuit that includes the electro-magnets 338. Again, the energizing of the electro-magnets 338 instantly disrupts the circuit through contacts 373a and 373b and establishes the circuit that includes the no-voltage release contacts 368a and 368b, the main switch contacts 330a and 330b and canopy switch solenoid 320. The main electric motor starts to run, the rinse cams leave the main switch contacts allowing one set to open at 330a and 330b and another set to open at 332a and 332b, thus deenergizing the canopy switch solenoid 320 and allowing the armature 326 thereof to drop. The main electric motor continues to run because the canopy switch remains closed until the valve mechanism or four position cock 103 is returned to or positioned in its normal water softening arrangement and in this position the soft cams of the contactor 355 come into play to close certain of the main switch contacts, to wit, the set at 330a and 330b and also the set at 331a and 331b (see Fig. 13) whereby the no-voltage release solenoid circuit is completed.

It will be recalled that said no-voltage solenoid circuit thus completed includes said main switch contacts 330a and 330b, the no-voltage release contacts 368a and 368b and the canopy switch solenoid 320 and on its completion reenergizes the solenoid and lifts the armature so as to effect a movement of the canopy switch 327 to open position, thus disrupting the main motor circuit. This disrupting terminates the reconditioning cycle. When this is accomplished all the circuits are dead and the electric system and parts of the water softening apparatus are in the position which they occupy during normal water softening period. The apparatus remains in this position until a reconditioning cycle is again initiated as by closing the starting-up or secondary switch 300 either by hand or automatically; for example, by a timing motor—a time clock or a water meter serving as a motor—to position a movable member of the switch to circuit closing position; such water meter would thus serve as a motor as shown and described in connection with the arrangement of Figures 9 to 12.

The no-voltage release switch 368, the timing switch 373, and the timing motor 387 of the above description are assembled in a unit which is shown in Figures 19 and 20 and will next be described in detail.

*No-voltage release switch and timing switch*

The no-voltage release switch 368 and the timing switch 373 previously referred to in connection with the system or arrangement of Figures 13 to 16 inclusive are shown in a combined arrangement in Figures 19 and 20. These two switches are mounted on a suitable base, as 21. The timing switch motor 387 is secured to the base through the medium of standards 22. The rotor 389 of the motor drives a contact positioning screw 24 through the medium of suitable speed reducing gearing 23. This speed reducing gearing comprehends such members as worm-screw 25, worm-wheel 26, shaft 27, worm-screw 28 and worm-wheel 29 all of which are suitably supported, although some of the supports have been omitted from the drawings for the sake of clearness. The contact positioning screw 24 has a shaft 30 providing trunnion or bearing portions that ride in bearings or standards 31 that in turn are secured to the base 21. The threaded portion 33 of the screw 24 has associated therewith a "nut" or follower 32 which is normally in engagement with the threaded portion 33. This nut or follower carries a yielding strip 39 which has at the upper end thereof the movable contact member 373b and through this strip 39 said contact member 373b is electrically connected to wire 374 of the electric system. The strip 39 while carried by the nut or follower is electrically insulated therefrom. A swinging frame 34 is pivotally mounted at its lower end to a set of standards 54 that are on the base 21. This swinging frame comprises the upright side members 35, a lower rod 36 rigidly secured to the side members and two upper parallel rods 37 and 37a. The nut or follower is slidably mounted on said parallel rods and on one of these rods there is carried an adjustable stop 44 which can be positioned so as to regulate the extent of travel of the nut and the full open position of contact 373b carried by the nut. It is by this stop that one regulates or determines the time required for closing the switch 373 by the timing motor when it operates. The swinging frame is normally held in its rear position by a spring construction which includes an arm 40 secured to the lower rod 36 and tension spring 41 which is secured at 42 to a supporting frame 55 that carries the electro-magnet 338.

When the swinging frame is in its normal or rear position the nut or follower 32 carried thereby is in engagement with the threaded portion 33 of the contact positioning screw 24. To this nut or follower there is pivotally connected the upper end 45 of a lever 43 the lower end 46 of which lever is pivotally connected, viz., fulcrumed, on the free end of a link 47 which in turn is pivotally mounted at 48 on one of the side members 35 of the swinging frame. A tension spring 49 extends from the other side member 35 to the central portion of the lever 43 whereby a pull is continuously exerted on the nut or follower 32, tending to force the latter toward or against the adjustable stop 44. When the screw is turning whereby the screw-threaded portion 33 is moving the nut or follower 32 and consequently the movable contact 373b to switch closing position the screw is doing this against the tension of the spring 49. The swinging frame 34 carries a strip 38, preferably electrically insulated from the frame, which in turn carries the relatively stationary contact 373a and through the medium of this strip the contact 373a is electrically connected to the wire 372 of the electric system. The swinging frame 24 also carries an armature 50 which is arranged so as to be under the influence of the coils of the electro-magnet 338. The armature is carried on and by said swinging frame through the medium of a cross-bar 51 the ends 52 of which cross-bar are secured to the side members 35 of the swinging frame. This cross-bar also carries a strip 56 which in turn carries the movable contact 368a. This strip and the electro-magnetic armature 50 are insulated from each other and also from the cross-bar 51. The movable contact 368a is electrically connected through the medium of said strip 56 with the wire 367. Another strip 57 is carried by but electrically insulated from the supporting frame 55 and in turn carries the relatively stationary contact 368b. This strip 57 serves to electrically connect the contact 368b to wires 377 and 369 leading thereto and therefrom.

From an inspection of the drawings it will be manifest that when the electro-magnet 338 is not energized, then the motor 387, if operating, can through the medium of the speed reducing gearing 23, the screw 24 and nut or follower 32 move the contact 373b into engagement with contact 373a and thus close the timing switch 373, sometimes hereinbefore referred to as secondary time switch mechanism. On the other hand, when the electro-magnet 338 is energized the armature 50 is attracted toward the coils thereof with the attendant result (a) that contact 368a is swung forwardly into engagement with contact 368b thus closing switch 368; and (b) that the nut or follower 32 is swung forwardly from its rear position and out of engagement with the screw portion 33 of the contact position screw 24, thus allowing the tension spring 49 to become effective and restore the movable contact 373b to its full open position, to wit, with the nut or follower 32 in engagement with the adjustable stop 44. It will be noted when the time controlled switch mechanism and the no-voltage release switch are combined as shown in Figures 19 and 20 and are employed in the system or arrangement as illustrated in Figures 13 to 16 inclusive that as soon as contact 373b engages contact 373a there is completed a circuit which indirectly results in the completing of a circuit that includes the electro-magnet 338 whereby the said electro-magnet swings the frame 34 forwardly and results in the disruption of any circuit through switch 373—accompanied by the restoring of contact 373b to full open position under the tension of spring 49—and the simultaneous closing of switch 368 and the completing thereby of a circuit.

The electrical arrangements of Figures 1 to 16 inclusive, above described, are applied to water treating apparatus having various types of members for controlling the functional characteristics thereof.

The electrical arrangements of Figures 5 to 16 inclusive are shown and described in connection with valve mechanisms which have a plurality of functioning positions and more particularly with the valve mechanisms having four position arrangements, to wit, as with a valve mechanism employing the four position cock 103. Any of the electrical systems or arrangements of Figures 5 to 16 can be changed as from an arrangement for a four position cock to any other multi-position arrangement, varying the number of sets of control cams and the electrical circuits corresponding thereto; for example, to an arrangement for a three position cock merely omitting a set of control cams and the electrical circuit or circuits corresponding thereto.

Three and four position valve mechanisms or cocks are now available for use in water softening apparatus but the electrical arrangements of Figures 5 to 16 are shown as used in connection with water treating apparatus employing a four position valve or cock which is shown in Figures 21 to 26 hereof and which is particularly adapted for use in a water softening apparatus of either Figure 17 or Figure 18. The present invention includes improvements in a four position valve arrangement, said four position valve being the invention of another. Applicant considers his invention is more clearly brought out if a description of the construction of the said four position valve is herein incorporated and hence a description thereof follows. This said valve or cock is designated as 103 and, as the name implies, has four operating positions; that is, softening, backwashing, introducing of brine or regenerating, and rinsing. In the valve as shown the four operating positions are 90 degrees apart.

*Water softening apparatus (Figures 17 and 18)*

In Figures 17 and 18 there are shown water softening apparatus which illustrate the employment in combination with the operative parts thereof of the electric systems or arrangements of Figures 5 to 16 inclusive.

In Figure 17 there is shown a water softening apparatus which is fully automatic because there is connected therein and cooperatively associated with the parts thereof the electric full automatic system or arrangement of Figures 9 to 12 inclusive and in this full automatic system the automatically controlled starting-up switch 200 thereof is operatively associated with the water meter 202. The electric semi-automatic system or arrangement of Figures 5 to 8 inclusive applies to the apparatus of Figure 17 in exactly the same way that the electric full automatic arrangement of Figures 9 to 12 inclusive applies, with the exception that when the semi-automatic system is used there is no connection between the starting-up switch thereof and the water meter 202, but instead there is employed an external starting-up switch which is hand-operated; to wit, switch 100 of Figure 5. In Figure 17 the water meter is shown as being connected in the outlet pipe or service line leading from the water softening apparatus, but it will be manifest that this meter could be placed on the hard water or inlet pipe, if so desired. Further details as to the operative features will be apparent from the specific description of Figures 5 to 11 inclusive.

In the apparatus of Figure 18, there is shown a water softener which is an electric semi-automatic system because there is connected to and cooperatively associated with the parts thereof the electric semi-automatic arrangement of Figures 13 to 16 inclusive. In connection with the automatic and semi-automatic systems of Figures 5 to 12 inclusive the reconditioning cycle when once initiated is automatically carried out through the successive steps under the control of the electric timing motor 110 and consequently switch contact control driven thereby; the closing of the several secondary switch contacts is therefore under the influence of said timing motor. In the semi-automatic arrangement of Figures 13 to 16 one of the sets of the secondary switch contacts for one of the reconditioning steps, instead of being under the influence of the timing motor (as 387), is under the control of a float, as 397, in the brine tank and the water softening arrangement of Figure 18 has been incorporated primarily to bring out more clearly this feature and the water treating apparatus employing the same. For further detail information with respect to the functioning of the electric system or arrangement of this figure reference is made to the description relating to Figures 13 to 16 inclusive.

*The four position valve and its operation in the water softening apparatus of Figures 17 and 18*

In Figs. 21 to 26 are shown the details of a four position valve or cock, adapted to perform the function of the valve mechanism or cock hereinbefore designated as 103 and which has a driven member 104 that is in turn driven by the rotor of the main electric motor of the particular system or electrical arrangement of which the motor constitutes a part. The same reference characters have therefore been applied to these functional elements of the said four position valve. The valve or cock, as the name implies, has four operating positions; that is, softening, backwashing (sometimes referred to for short as washing), introducing brine or regenerating, and rinsing. This valve is a rotary slide valve and is shown in Figures 21 to 26 inclusive. The ports are located in a circle around the body of the valve in the bottom portion, there being shown a hard water port 421, soft water port 422, top port 414, bottom port 415, brine port 423, and waste port 425. These ports all have openings leading into the bottom of the chamber containing the valve plug 103a. Port plate 486 is placed between the plug 103a and the port openings; the port plate 486 has an opening therein communicating with the port openings therein as follows: openings 495, 496, 497 communicate with top port 414; openings 498, 499, 500 communicate with bottom port 415; opening 501 communicates with soft water port 422; opening 502 communicates with waste port 425; opening 503 communicates with brine port 423; opening 504 and ejector nozzle 490 communicates with brine inlet 491 formed in the body of the valve and communicating with ejector discharge passage 492 running through fitting 492a and discharging into top port 414. Fitting 493a attached to the bottom portion of the valve casing together with counter flange 413 forms a narrow annular opening which serves to distribute the water or brine (from brine tank 427) respectively flowing through the top port 414 into the water softening chamber 410 of the softening tank ST. Plug 103a is held against the port plate 486 by spring 488a; it is rotatable by means of the stem 104 and the two pins 104b. As shown in Figure 21 the hard water port 421 is in constant communication with the compartment 511 formed in the valve casing above the plug 103a. The plug 103a is formed with two channels 505 and 506 in the bottom thereof adapted to establish connection between different pairs of port plate openings as the plug is rotated. The plug 103a also has four openings 507, 508, 509 and 510 running through the entire thickness of the plug and adapted to establish connection between compartments 511 and the various port plate openings.

The operation of this valve is as follows:

In the softening position (Figures 21 and 23) hard water enters through port 421 and flows through compartment 511, openings 507 and 495 to the top port 414 and the softened water flows from the bottom of the zeolite chamber through pipe 416, bottom port 415, opening 498, passage 505 and opening 501 to the soft water port 422. The backwashing (Figure 24) is via compartment 511, openings 507 and 500, bottom port 415 to the bottom of the zeolite chamber, upwardly through zeolite bed and out of the chamber via port 414, opening 496, passage 506, opening 502 and port 425 to waste. A bypass of hard water to service is established by openings 508 and 501. In the regenerating position (Figure 25) water flows via openings 509, 501 forming a bypass to service and also via opening 507 to injector nozzle 490. The flow through the injector draws brine from brine tank 427—some times designated BT—through inlet 491, opening 504, channel 505, opening 503 and brine port 423. The discharge is through passage 492 into the top of the zeolite chamber 410. The spent brine runs to waste from the bottom of the chamber through pipe 416, bottom port 415, opening 498, channel 506, opening 502 and waste port 425. In the rinsing position (Figure 26) water is bypassed to service through openings 510 and 501 and also flows through openings 507 and 497 to the top of the zeolite chamber 410. Since a more effective regeneration is obtained by the rinsing of the brine at a low rate of flow the opening 497 is made of such size as to throttle the flow of water and insure the most desirable rinse rate. The spent rinse water flows from the bottom of the chamber through pipe 416, bottom port 415, opening 499, channel 506, opening 502, and is discharged to waste from waste port 425.

In some cases a bypass of hard water to service during the reconditioning cycle is not desired. This result is easily accomplished by elimination of the openings 508, 509 and 510 from the plug 103a.

As shown in Figures 17 and 18 the brine pipe 423 is entirely unobstructed and the quantity of brine is controlled by the length of time the valve is kept in regenerating position. An especial feature of this design is that in turning from the regenerating or brining position to the rinsing position the opening 507 passes over opening 503 causing a flow of hard water through brine pipe 423 for a very short period of time. In this manner the brine pipe is flushed out and cleared of any obstruction which may have been located in it. Since the regenerating operation is controlled, as by time, a refill line as 424 may be connected to the hard water inlet 421 if desired, or as shown in both Figure 17 and Figure 18 to the soft water outlet 422.

Automatic operation of the said valve is readily realized by the employment of my electric system shown in Figures 9 to 12 previously described.

Motor controlled secondary switch

This is the switch numbered 200 that is employed in the electric full automatic softener and which has heretofore been described in a general way, particularly as to its functional characteristics in conjunction with the electric system of Figures 9 to 12 inclusive. In order that the detail features of this switch may be more clearly brought out there have been incorporated Figures 27 to 31 inclusive which will now be described.

It has heretofore been noted that the water meter 202 functions as a motor and that the driven shaft 203 thereof moves or drives the movable contact 201 of the secondary switch 200. Therefore, this switch is sometimes referred to as a motor controlled switch as well as a meter controlled switch.

As has been previously pointed out the movable contact 201 of the switch 200 is driven from the motor shaft 203 through a train of speed reducing gearing SR and a one-way driving clutch 204, the driven member of which clutch has a rigid connection to the movable contact 201 for moving it forwardly to circuit closing position. Also, as previously described, the movable contact 201 after having been moved to circuit closing position by the water meter serving as a motor is restored to zero position by means of an electric motor or electric clock 205 through the medium of the speed reducing gearing SR and a one-way driving clutch 242, the driven member of which clutch is rigidly connected to the movable contact 201 for moving it forwardly from its circuit closing position to its zero position. The several members just described are assembled in a unit that has a base or common support member 60, preferably of electric insulating material upon which the several operative parts are suitably supported by members such as 61 and 62 which provide both the standards that are suitably secured to the base and the bearings for the horizontal rotatable shafts of the unit. This base 60 also carries an upright sleeve 63 providing bearings for the vertical shaft 64 which is a part of the speed reducing gearing SR between the driven shaft 203 of the water meter 202 and the movable contact member 201 of the switch 200. The lower end of shaft 64 has a plate 65 that engages and is driven by a meter disk 203a which is connected to and carried by the driven shaft 203 of the meter. The upper end of the shaft 64 has a worm 66 which drives a worm gearing 67 that is secured to and drives a shaft 68.

The one-way clutch 204 is shown in section in Figure 29—which is a view taken as on the line 29—29 of Figure 27 looking in the direction of the arrows. Shaft 68 is secured to and drives a driving member 69 of the clutch 204 which member 69 in turn, through the medium of spring-pressed gripping pins 70, serves to forwardly drive a driven member 71 of the one-way driving clutch. The spring-pressed pins 70 are releasable and allow member 71 to be driven forwardly relative to the member 69 by the timing motor, when that functions. The driven member 71 is rigidly connected to the driven contact or member 201 of the switch through the medium of a shaft 72 and a bushing member 73 in the nature of a coupling which is made of electric insulating material. The electric motor 205 is preferably a "synchronous" electric clock mechanism and is provided with suitable speed reducing gearing SR between the operating or driving elements thereof and the parts driven thereby, all of which are carried and suitably supported by the standards 62 which are in effect frame members of the clock and reducing gearing mechanism. This speed reducing gearing concludes with the shaft 74 which when the clock operates is driven in the direction of the arrow and thus drives in a forward direction a driving member 69a (see Fig. 30) of the clutch 242 and thereby through the medium of gripping pins 70a the gripping member 71a of the one-way driving clutch. The spring-pressed pins 70a allow the member 71a to be driven forwardly with respect to the driving member 69a by the water meter when that functions.

The motor controlling switch 200, to wit, the switch proper, comprises the movable contact 201 which is of brass or other electrical conducting material and which has a cylindrical or drum portion 75 that carries a band or strip 76—which band is almost but not quite a complete ring—of suitable insulating material. A side or edge view of this band is shown in Figure 3f. The band ends stop or are spaced apart so as to provide an interrupted space at 77 and has a sharp or sudden "drop-off" end, as at 78a, and a gradual tapering "lift-up" end, as at 78b. The base 60 carries a brush terminal 79 to which wire 155b is connected and a brush 80 of the terminal 79 electrically engages the driven contact member 201 of the switch. This base 60 also carries a spring-pressed contact 81 to which wire 154 is connected. This contact 81 normally engages the insulating band or strip 76 but when the water meter drives the contact 201 from its zero position a sufficient distance then contact 81 snaps off the "drop-off" end 78a of the strip and into electrical engagement with the brass body portion of contact 201, thus completing the circuit that includes these parts and thereby initiates the reconditioning cycle of Figures 9 to 12 inclusive.

The band or strip 76 is clamped or held in place on the cylindrical portion or drum 75 by a clamping ring 82 which clamps the band between it and the flanged portion 83 of the movable contact member 201. Because of this clamping ring it is possible to position the interrupted portion 77 of the band 76 at any point desired in reference to the notch 241 which determines the zero position of the contact 201 and which notch is in the flanged portion 83 of the movable contact 201. The feature of adjustably positioning the interrupted portion 77 of the band 76 is provided in order that one may regulate the periodical regeneration according to the hardness characteristics of the water being softened. The base 60 also carries two contacts 230 and 231, at least one of which, to wit, 230, is embodied at the end of a flexible spring strip 230a. Except when the contact member 201 is at zero position, or at least substantially that position, the member (or finger) 240 on the flexible strip 230a engages, but only under slight pressure, the flange 83 in a manner to hold contacts 230 and 231 in closed position, this being the general normal position while the water meter is forwardly moving the contact member 201 from zero to circuit closing position. The contacts 230 and 231 remain closed so that when the reconditioning cycle is initiated by contact 81 dropping off the insulating band 76 and springing into electrical engagement with member 201 there follows a starting up of the electric motor or "synchronous electric" clock 205 and a consequent forward movement of the movable contact member 201 of the switch from circuit closing position to zero position; that is, until the member or finger 240 drops into the notch at 241 and consequently opens contacts 230 and 231 and thus disrupts that part of the circuit that includes the motor 205. The switch is now in zero position and the movable contact thereof remains in that position until moved therefrom by the water meter 200 serving as a motor.

It will be noted that there is relatively little work put on the meter because the frictional resistance of the members above described is relatively small.

General

While the electric systems of the water softening apparatus have been described with reference to a multiple position valve and more particularly with reference to a four position cock or valve still according to the broader aspects of the invention the electric systems or arrangements are applicable to operate or control the valve mechanisms of a water softener which may comprehend instead of a single multiple position valve a series of several valves operated from a common controlling mechanism or member. Moreover, the electric systems or arrangements are not limited to a water softening apparatus functioning according to the particular steps described with reference to the particular four position valve described but are applicable to any water softening apparatus which has, following the normal water softening operation, a reconditioning cycle that employs other steps or series of steps than those specifically described herein.

It will be manifest that the invention and improvements herein disclosed may be embodied in various forms and modifications without departing from the spirit and scope thereof and still be within the purview and intention of the claims hereof.

What I claim is:—

1. A water treating apparatus having a water meter that serves as a secondary motor, means for controlling the treatment carried out in said apparatus, a main electric motor having a rotor, a speed reducing gearing driven by the rotor, a second speed reducing gearing driven by the spindle of the water meter, and a plurality of main electric motor circuits provided with a main switching mechanism and a circuit completing switch, said main switching mechanism having a circuit disrupting member which is driven from the rotor of said main electric motor through the medium of the speed reducing gearing that is driven by said rotor, the means for controlling the treatment also being driven from said rotor through the medium of the speed reducing gearing that is driven by said rotor, said circuit disrupting member being arranged so as to cause the main switching mechanism to always have a set of contacts thereof in closed position for some one or other of the main motor circuits but so as to open a set of contacts thereof to disrupt one of the motor circuits after it has been completed by the circuit closing switch and when the rotor of the motor has made a predetermined number of turns, said circuit completing switch having a movable member which is driven from the secondary motor through the medium of said second speed reducing gearing so as to cause successive closing of the main motor circuits in a frequency automatically coordinated with the rate of flow of the water being treated.

2. A water treating apparatus having means for controlling the functional characteristics thereof, a main electric motor having a rotor, a first speed reducing gearing, a secondary motor operative to regulate certain functional characteristics of said apparatus, a second speed reducing gearing, a plurality of main electric motor circuits, a main switching mechanism common to said circuits, and a secondary switching mechanism or circuit completing switch also common to said circuits, said main switching mechanism having a circuit disrupting member or contactor which through the medium of said first speed reducing gearing is driven from said rotor, the means for controlling the functional characteristics also being operated from said rotor through the medium of said first speed reducing gearing, said circuit disrupting member being arranged so as to cause the main switching mechanism to establish closed position for some one or other of the main motor circuits but so as to disrupt a motor circuit that has been completed by the circuit closing switch and upon the rotor of the motor completing a predetermined number of turns, said secondary switching mechanism having a movable member which through the medium of said second speed reducing gearing is driven by said secondary motor so that said driven movable member can effect a successive closing of the main motor circuits at intervals determined by the secondary motor.

3. A water treating apparatus comprising in operative combination a treating tank, pipe lines leading thereto and therefrom, a water meter which serves as a secondary motor in one of said lines, means for controlling the water treatment carried out in said tank, an intermittently operated main electric motor having a rotor connected through the medium of speed reducing gearing so as to periodically move said controlling means, a plurality of main electric motor circuits by which electrical energy is supplied for intermittently operating said motor, the rotor of said motor being connected through the medium of adjustable speed reducing gearing to a circuit disrupting member of a main switching mechanism, which circuit disrupting member always has a closed position for some one or other of the main electric motor circuits but serves to disrupt any one of said circuits after it has been closed to operate the motor and when the rotor of the motor has made a predetermined number of revolutions, and a circuit completing switch having a movable contact closing member which is driven from the water meter through the medium of speed reducing gearing so that the circuit completing switch successively closes the main motor circuits.

4. A water treating apparatus having pipe lines for leading thereto water to be treated and for conducting therefrom the water when treated, said apparatus comprising in combination a main electric motor having a plurality of circuits each, when closed supplying electrical energy for operating said motor, a secondary timing motor having a rotor with associated speed reducing gearing through which said rotor operates to drive a movable contact closing member of a circuit completing switching mechanism, and a controlling means for determining the operative steps carried out in said apparatus, said main electric motor having a rotor with associated speed reducing gearing through which said main electric motor intermittently operates said controlling means and also a circuit disrupting member or contactor of a main switching mechanism that is common to said main electric motor circuits, said main switching mechanism being constructed so that said circuit disrupting member always effects a closed position for some one or other of the main electric motor circuits but serves to disrupt the main electric motor circuit closed thereby after the main electric motor has operated to turn the rotor thereof the required number of revolutions, the circuit completing switch being common to certain of said main electric motor circuits whereby as the movable contact closing member thereof is driven by the secondary timing motor through the medium of the speed reducing gearing thereof it serves to successively close the circuits to which it relates.

5. In combination, in a water treating apparatus a driven controlling member which by successive movements determines and controls the proper effective functioning of the apparatus, an intermittently operated main electric motor having a rotor constructed so as to drive and cause actuation of said driven controlling member, a second driven member, and a secondary electric motor for driving and causing actuation of said second driven member in accordance with a functional characteristic of the water treating apparatus, said main electric motor having wiring provided with different circuits for supplying electrical energy for intermittently operating it, there being a plurality of associated secondary and main switching mechanisms that cooperate in closing and subsequently opening one circuit at a time and successively the different circuits, the secondary switch mechanism comprising certain sets of circuit closing contacts that are closed by said second driven member, said main switch member having a contactor that serves as a circuit disrupting member and which contactor is driven from the rotor of the main electric motor.

6. A water softening apparatus having a softening tank, a brine tank, suitable piping and suitable valve controlling means by which there are established the proper flows through the piping so that the steps of a reconditioning cycle follow a normal water softening period and by which the apparatus is restored to its normal water softening arrangement, said water softening apparatus comprising in combination a driven member of said valve controlling means by the successive movements of which there is determined and controlled the successive stages of the reconditioning cycle that follows the softening period and the restoration to softening arrangement, an intermittently operated main electric motor having a rotor constructed and connected so as to drive and cause actuation of said driven valve controlling member, and a second driven member and a timing secondary motor for driving and causing actuation of said second driven member, said main electric motor having wiring provided with suitable switches and providing several different electric main motor systems or arrangements said suitable switches comprising a plurality of associated switching mechanisms for cooperating in the starting and stopping of said motor by controlling the functioning of the electrical systems or arrangements, one of said switching mechanisms being termed a main switching mechanism and comprising a circuit disrupting member or contactor which is driven and caused to be actuated by the rotor of the main electric motor so that the contactor and said driven valve member have harmonized movement, another of which switching mechanisms comprises secondary circuit closing switches, at least a plurality of which secondary circuit closing switches as to closing, are under the control of said second driven member which is actuated by said timing secondary motor.

7. A water softening apparatus having a softening tank with a bed of base exchange material therein, a brine tank, suitable piping and suitable valve means controlling the flow through the piping by which a reconditioning cycle can follow a normal water softening period and by which the apparatus is restored to its normal water softening arrangement, said water softening apparatus comprising in combination a driven controlling member which by its successive movement determines and controls the successive stages of the reconditioning cycle, an intermittently operated main electric motor having a rotor construction so as to drive and cause actuation of said driven controlling member, said main electric motor having wiring provided with associated switching mechanisms and providing several different electrical main motor systems or arrangements whereby the starting and stopping of the main electric motor is under the control of said associated switching mechanisms, one of said switching mechanisms being termed the main switching mechanism and comprising a contactor which is driven and caused to be actuated by the rotor of said main electric motor whereby certain switch contacts of the main switching mechanism are opened and closed in harmonized relation with respect to the movement of the driven controlling member, other of which switching mechanisms are herein termed secondary switching mechanisms and at least some of which are closed under the influence of a member driven from a secondary timing motor.

8. An arrangement as described in the claim last preceding in which one of said secondary switches is closed under the influence of a lowering float and which lowers as the brine passes from the brine tank to the softening tank for the purpose of regenerating the bed of base exchange material in the softening tank.

9. A water softening apparatus having a water softening tank with base exchange material therein, means for supplying brine to the base exchange material during the regenerating stage of reconditioning cycle, suitable piping and suitable valve means for controlling the flow into, through and from the water softening tank; said apparatus comprising in combination (a) a driven valve controlling member which by successive movement following a water softening period functions in determining and controlling the successive stages of a reconditioning cycle that includes backwashing, brining, rinsing, and the return to normal water softening arrangement; (b) an intermittently operated main electric motor having a rotor constructed so as to drive and cause actuation of said driven valve controlling member; (c) a second driven member; and (d) an electric timing motor for driving and causing actuation of said second driven member, said main electric motor having wiring with suitable switches therefor whereby there are provided several different electric arrangements for successively operating said main electric motor, one of said switching mechanisms being termed a main switching mechanism and having a movable contactor which is driven and caused to be actuated by the rotor of said main electric motor whereby the contactor and said driven controlling member have harmonized movement, other of which switching mechanisms are termed secondary circuit closing switches and some of which are closed by a movable contact closing member which is caused to be actuated through its several positions by said timing motor.

10. An apparatus as defined in preceding claim 6 in which there is provided an outside switch which can be relied upon to complete a circuit and thus start the operation of the main electric motor to initiate the reconditioning cycle which is automatically carried out thereafter.

11. An apparatus as defined in preceding claim 6 in which the timing motor is an electric motor that is included in an electric circuit which is automatically completed by but after the starting up of the main electric motor but at least as early as the starting of the first stage of the reconditioning cycle.

12. An apparatus as defined in preceding claim 6 in which the timing motor is an electric motor included in an electric circuit adapted to be automatically completed by but after the starting up of the main electric motor but at least as early as the starting of the first stage of the reconditioning cycle, said timing motor circuit being also adapted to be maintained closed during at least a period that includes a plurality of stages of the reconditioning cycle and to be disrupted upon the termination of the reconditioning cycle and at least prior to the restoration of the apparatus to water softening arrangement.

13. An apparatus as defined in preceding claim 6 in which is provided an outside switch adapted to start the operation of the main electric motor to initiate the reconditioning cycle which is thereafter automatically carried out, said outside switch having a movable contact member which is movable from zero position to a circuit closing position and is driven through the medium of a one-way driving clutch from the driven spindle of a meter through which there flows water in accordance with the flow of water through the water softening tank and whereby the reconditioning of the apparatus is initiated in accordance with the quantity of water softened.

14. An apparatus as defined in preceding claim 6 in which is provided an outside switch adapted to start the operation of the main electric motor to initiate the reconditioning cycle which is thereafter automatically carried out, said outside switch having a movable contact member which is movable from zero position to a circuit closing position and is driven through the medium of a one-way driving clutch from the driven spindle of a meter through which there flows water in accordance with the flow of water through the water softening tank and whereby the reconditioning of the apparatus is initiated in accordance with the quantity of water softened, said apparatus being also provided with a third electric motor arranged to move—through the medium of a one-way driving clutch—the movable contact of the outside switch from its contact closing position to a zero position, which said third electric motor is in a circuit that is automatically established when the reconditioning cycle starts but which is automatically disrupted when the movable contact of the outside switch is restored to its zero position.

15. A water treating apparatus having in combination a main electric motor having a rotor, a valve controlling mechanism and a circuit disrupting member both under the control of the rotor, a main electric motor circuit, an electro-magnet, an electromagnetic switch, an electromagnetic circuit, and a secondary switch the closing of which causes a closing of the main electric motor circuit and a closing of the electromagnetic circuit, said main electric motor circuit having a main switch normally closed but controlled as to opening by the circuit disrupting member, said electromagnetic switch being closed by the electro-magnet when energized due to the closing of the electromagnetic circuit and which electromagnetic switch functions to maintain closed the electromagnetic circuit whereby the main motor circuit continues completed until disrupted by the rotor turning sufficiently to cause the circuit disrupting member driven by the rotor to open the motor circuit and to disrupt the current in the electromagnetic circuit.

16. In a water softening apparatus having a softening tank, a brine tank, and suitable valve means by which there are established the proper flows through the apparatus so that the steps of a reconditioning cycle follow a normal water-softening period and by which the apparatus is brought back to its normal water softening arrangement, means for operating and regulating said valve means comprising in combination a driving member for said valve means, by the successive movements of which are determined and controlled the successive stages of the reconditioning cycle, a speed-reducer, an intermittently operable main electric motor adapted to drive said driving member through the speed reducer, a timing member and a timing secondary motor for driving and causing actuation of said timing member, said main electric motor having wiring provided with suitable switch means and providing a plurality of different electric main motor circuits, said switch means comprising a plurality of associated switching mechanisms for cooperating in the starting and stopping of said motor by controlling the functioning of the electrical circuits, one of said switching mechanisms comprising one or more contact-making means carried by said valve driving member and adapted to make connections in a plurality of the electrical circuits, said timing member and said timing secondary motor being adapted to make contacts in one or more of said main motor circuits.

17. A regenerative base exchange water softening apparatus having in combination valve means and a main electric motor for shifting said valve means to a plurality of positions for softening and regeneration, a plurality of main motor circuits, switch means for closing a circuit through said main motor whereby to initiate shifting of the valve means, means operatively connected with the motor for opening said circuit upon shifting of said valve means from one operative position to another operative position, a secondary constant speed electric motor having a rotor and being arranged to operate when said valve means is in position for regeneration, and means moved by said rotor for closing one or more of the main motor circuits after a predetermined number of revolutions of the rotor.

EUGENE STAEGEMANN.

CERTIFICATE OF CORRECTION.

Patent No. 1,914,333.  June 13, 1933.

EUGENE STAEGEMANN.

It is hereby certified that error appears in the printed specification of the above numbered patent requiring correction as follows: Page 3, line 25, for "nomal" read "normal"; page 5, line 94, for "mechanisms" read "mechanism"; page 6, line 1, for "drawings" read "drawing"; and line 77, for "for" read "of"; page 10, line 23, after "canopy" insert "switch"; and line 25, for "the" read "to"; page 12, line 80, for "position" read "positioning"; and that the said Letters Patent should be read with these corrections therein that the same may conform to the record of the case in the Patent Office.

Signed and sealed this 15th day of August, A. D. 1933.

M. J. Moore.

(Seal)  Acting Commissioner of Patents.